United States Patent
Zhang et al.

(10) Patent No.: US 12,519,968 B2
(45) Date of Patent: *Jan. 6, 2026

(54) MOTION VECTOR RANGE BASED ON MOTION VECTOR PRECISION

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/511,098

(22) Filed: Nov. 16, 2023

(65) Prior Publication Data
US 2024/0098296 A1    Mar. 21, 2024

Related U.S. Application Data

(63) Continuation of application No. 17/523,286, filed on Nov. 10, 2021, now Pat. No. 11,843,798, which is a (Continued)

(30) Foreign Application Priority Data

Dec. 21, 2018 (WO) ................ PCT/CN2018/122740

(51) Int. Cl.
*H04N 19/00*    (2014.01)
*H04N 19/172*    (2014.01)
(Continued)

(52) U.S. Cl.
CPC ......... *H04N 19/513* (2014.11); *H04N 19/172* (2014.11); *H04N 19/176* (2014.11);
(Continued)

(58) Field of Classification Search
CPC .. H04N 19/513; H04N 19/172; H04N 19/176; H04N 19/184; H04N 19/186; H04N 19/51; H04N 19/517
See application file for complete search history.

(56) References Cited

U.S. PATENT DOCUMENTS

| | | | |
|---|---|---|---|
| 7,920,628 | B2 | 4/2011 | Kojokaro et al. |
| 8,379,723 | B2 | 2/2013 | Chiu et al. |

(Continued)

FOREIGN PATENT DOCUMENTS

| | | |
|---|---|---|
| CN | 1456999 A | 11/2003 |
| CN | 101005620 A | 7/2007 |

(Continued)

OTHER PUBLICATIONS

Notification to Grant Patent Right for Invention for Chinese Application No. 201980083817.0, Oct. 22, 2024, 6 Pages.
(Continued)

*Primary Examiner* — Zhihan Zhou
(74) *Attorney, Agent, or Firm* — Conley Rose, P.C.

(57) ABSTRACT

A method for video processing is provided to comprise: determining a motion vector precision of one or more motion vectors related to a current video block of a video; selecting, based on the motion vector precision, a motion vector range; and performing, based on the motion vector range, a conversion between the current video block and a bitstream representation of the video.

18 Claims, 32 Drawing Sheets

Related U.S. Application Data continuation of application No. 17/212,339, filed on Mar. 25, 2021, now Pat. No. 11,197,016, which is a continuation of application No. PCT/CN2019/127011, filed on Dec. 20, 2019.

(51) Int. Cl.
*H04N 19/176* (2014.01)
*H04N 19/184* (2014.01)
*H04N 19/186* (2014.01)
*H04N 19/51* (2014.01)
*H04N 19/513* (2014.01)
*H04N 19/517* (2014.01)

(52) U.S. Cl.
CPC ......... *H04N 19/184* (2014.11); *H04N 19/186* (2014.11); *H04N 19/51* (2014.11); *H04N 19/517* (2014.11)

(56) References Cited

U.S. PATENT DOCUMENTS

| | | |
|---|---|---|
| 9,432,667 B2 | 8/2016 | Seregin et al. |
| 9,473,779 B2 | 10/2016 | Rapaka et al. |
| 9,578,328 B2 | 2/2017 | Rapaka et al. |
| 9,578,339 B2 | 2/2017 | Rapaka et al. |
| 9,900,593 B2 | 2/2018 | Xiu et al. |
| 9,912,964 B2 | 3/2018 | Zhang et al. |
| 9,961,372 B2 | 5/2018 | He |
| 10,034,010 B2 | 7/2018 | Hendry et al. |
| 10,045,014 B2 | 8/2018 | Zhang et al. |
| 10,045,041 B2 | 8/2018 | Zhang et al. |
| 10,306,253 B2 | 5/2019 | Wang et al. |
| 10,412,406 B2 | 9/2019 | Zhang et al. |
| 10,516,882 B2 | 12/2019 | He et al. |
| 10,834,419 B2 | 11/2020 | Joshi et al. |
| 10,939,128 B2 | 3/2021 | Zhang et al. |
| 2012/0269270 A1 | 10/2012 | Chen et al. |
| 2013/0163668 A1* | 6/2013 | Chen .................... H04N 19/463 375/240.14 |
| 2013/0177082 A1* | 7/2013 | Sugio .................... H04N 19/56 375/240.16 |
| 2013/0294522 A1* | 11/2013 | Lim ..................... H04N 19/513 375/240.16 |
| 2014/0301463 A1 | 10/2014 | Rusanovskyy et al. |
| 2015/0085935 A1 | 3/2015 | Chen et al. |
| 2015/0195525 A1* | 7/2015 | Sullivan ................. H04N 19/17 375/240.16 |
| 2015/0195527 A1* | 7/2015 | Zhou .................... H04N 19/523 375/240.02 |
| 2015/0304665 A1 | 10/2015 | Hannuksela et al. |
| 2015/0381999 A1 | 12/2015 | Chuang et al. |
| 2016/0165263 A1* | 6/2016 | Zhang ................... H04N 19/70 375/240.12 |
| 2017/0332095 A1 | 11/2017 | Zou et al. |
| 2018/0084260 A1 | 3/2018 | Chien et al. |
| 2018/0098063 A1 | 4/2018 | Chen et al. |
| 2018/0131952 A1 | 5/2018 | Xiu et al. |
| 2018/0199057 A1 | 7/2018 | Chuang et al. |
| 2018/0199061 A1 | 7/2018 | Zhang et al. |
| 2018/0288430 A1 | 10/2018 | Chen et al. |
| 2020/0045309 A1* | 2/2020 | Xu ....................... H04N 19/159 |
| 2020/0077087 A1 | 3/2020 | He et al. |
| 2021/0099724 A1 | 4/2021 | Han et al. |
| 2021/0105482 A1 | 4/2021 | Zhang et al. |
| 2021/0127116 A1* | 4/2021 | Chen .................... H04N 19/176 |
| 2021/0211710 A1 | 7/2021 | Zhang et al. |

FOREIGN PATENT DOCUMENTS

| | | |
|---|---|---|
| CN | 101783958 A | 7/2010 |
| CN | 101883286 A | 11/2010 |
| CN | 102783149 A | 11/2012 |
| CN | 102835113 A | 12/2012 |
| CN | 103583044 A | 2/2014 |
| CN | 103650507 A | 3/2014 |
| CN | 104012096 A | 8/2014 |
| CN | 104038768 A | 9/2014 |
| CN | 104170381 A | 11/2014 |
| CN | 104322070 A | 1/2015 |
| CN | 104919804 A | 9/2015 |
| CN | 105874789 A | 8/2016 |
| CN | 105900420 A | 8/2016 |
| CN | 105900425 A | 8/2016 |
| CN | 106331703 A | 1/2017 |
| CN | 106454378 A | 2/2017 |
| CN | 107852512 A | 3/2018 |
| CN | 108124162 A | 6/2018 |
| CN | 108432250 A | 8/2018 |
| CN | 113228675 B | 8/2024 |
| EP | 0631444 A1 | 12/1994 |
| EP | 0631444 B1 | 12/1998 |
| EP | 0527011 B1 | 5/1999 |
| JP | 2007504760 A | 3/2007 |
| JP | 2007158855 A | 6/2007 |
| KR | 20120061035 A | 6/2012 |
| KR | 20150070848 A | 6/2015 |
| WO | 2012120863 A1 | 9/2012 |
| WO | 2012174973 A1 | 12/2012 |
| WO | 2013096018 A1 | 6/2013 |

OTHER PUBLICATIONS

Chinese Notice of Allowance from Chinese Patent Application No. 201980083817.0 dated Jun. 20, 2024, 8 pages.

Chinese Notice of Allowance from Chinese Patent Application No. 201980083816.6 dated May 22, 2024, 4 pages.

JVET-L0142-Lee et al. "CE4: Simplification of the Common Base for Affine Merge (Test 4.2.2)," Joint Video Experts Team (JVET) of ITU-T SG 16 WP 3 and ISO/IEC JTC 1/SC 29/WG 11, 12th Meeting, Macau, CN, Oct. 8-12, 2012, document JVET-L0142, 2018.

JVET-L0632-Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.

JVET-L0265-Zhang et al. "CE4: Affine Prediction with 4x4 Sub-Blocks for Chroma Components (Test 4.1.16)," Joint Video Experts Team (JVET) of ITU-T SG 16 WP 3 and ISO/IEC JTC 1/SC 29/WG 11 12th Meeting, Macao, CN, Oct. 3-12, 2018, document JVET-L0265, 2018.

JVET-L0054-Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

JVET-L1001-Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.

"Information Technology —High Efficiency Coding and Media Delivery in Heterogeneous Environments—Part 2: High Efficiency Video Coding" Apr. 20, 2018, ISO/DIS 23008, 4th Edition.

JCTVC-Y1002-Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

JVET-G1001-Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVETG1001, 2017. UEM-7.0: https://jvet.hhi.fraunhofer.de/svn/svn_HMJEMSoftware/tags/ HM-16.6-JEM-7.0, Nov. 10, 2021.

JVET-L0368-Chen et al.CE4: Affine Merge Enhancement with Simplification (Test 4.2.2), Joint Video Experts Team (JVET) of ITUT SG 16 WP 3 and ISO/IEC JTC 1/SC 29/WG 11, 12th Meeting, Macao, CN, 3-12, Oct. 2018, document JVETL0368, 2018.

(56) References Cited

OTHER PUBLICATIONS

JVET-M0479-MISRA et al. "Non-CE4: On Clipping of Scaled Motion Vectors," Joint Video Experts Team (JVET) of ITU-T SG 16 WP3 and ISO/IEC JTC 1/SC 29/WG 11, 13th Meeting, Marrakech, MA, Jan. 9-18, 2019, document JVET-M0479, 2019.

JVET-L0024-v2-YANG et al. "CE4: Summary Report on Inter Prediction and Motion Vector Coding," Joint Video Experts Team (JVET)of ITU-T SG 16 WP 3 and ISO/IEC JTC 1/SC 29/WG 1112th Meeting: Macao, CN, Oct. 3-12, 2018, document JVET-L0024, 2018. (cited in CN201980083979.4 NOA mailed Sep. 19, 2023).

International Search Report and Written Opinion from International Patent Application No. PCT/CN2019/127010 dated Mar. 13, 2020 (11 pages).

Corrected International Search Report and Written Opinion from International Patent Application No. PCT/ CN2019/127010 dated Mar. 17, 2021 (12 pages).

International Search Report and Written Opinion from International Patent Application No. PCT/CN2019/127011 dated Mar. 19, 2020 (10 pages).

International Search Report and Written Opinion from International Patent Application No. PCT/CN2019/127014 dated Mar. 19, 2020 (15 pages).

Non Final Office Action from U.S. Appl. No. 17/212,339 dated Jun. 15, 2021.

Notice of Allowance from U.S. Appl. No. 17/212,339 dated Oct. 20, 2021.

Non Final Office Action from U.S. Appl. No. 17/523,286 dated Apr. 21, 2023.

Notice of Allowance from U.S. Appl. No. 17/523,286 dated Aug. 4, 2023.

* cited by examiner

MOTION VECTOR RANGE BASED ON MOTION VECTOR PRECISION

CROSS REFERENCE TO RELATED APPLICATIONS

This application is a continuation of U.S. application Ser. No. 17/523,286, filed on Nov. 10, 2021, which is a continuation of U.S. application Ser. No. 17/212,339, filed on Mar. 25, 2021, which is a continuation of International Patent Application No. PCT/CN2019/127011, filed on Dec. 20, 2019, which claims the priority to and benefits of International Patent Application No. PCT/CN2018/122740, filed on Dec. 21, 2018. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to selecting and applying motion vector ranges for video coding are described. The described methods may be applied to both the existing video coding standards (e.g., High Efficiency Video Coding (HEVC)) and future video coding standards or video codecs.

In one representative aspect, the disclosed technology may be used to provide a method for video processing. This method includes deriving, based on unclipped previously calculated luma motion vectors of multiple luma blocks, a chroma motion vector for a chroma block associated with a current video block of a video; and performing, based on the chroma motion vector, a conversion between the current video block and a bitstream representation of the video.

In another representative aspect, the disclosed technology may be used to provide a method for video processing. This method includes determining a motion vector precision of one or more motion vectors related to a current video block of a video; selecting, based on the motion vector precision, a motion vector range; and performing, based on the motion vector range, a conversion between the current video block and a bitstream representation of the video.

In another representative aspect, the disclosed technology may be used to provide a method for video processing. This method includes determining to use an internal bit-depth of one or more motion vectors related to a current video block of a video, wherein the internal bit-depth have M bits, M is greater than 16, and the current video block uses a temporal motion vector prediction, performing a conversion between the current video block and a bitstream representation of the video based on at least M-bit motion vectors.

In another representative aspect, the disclosed technology may be used to provide a method for video processing. This method includes: determining to use a motion vector precision value for a precision of motion vectors for a conversion between a current video block of a video unit of a video and a coded representation of the video; and performing the conversion based on the precision of motion vectors according to the motion vector precision value, wherein a syntax element at the video unit level indicates the motion vector precision value.

In another representative aspect, the disclosed technology may be used to provide a method for video processing. This method includes: determining a parameter for a conversion between a current video block of a video and a bitstream representation of the current video block; and performing the conversion based on the parameter, wherein the determining the parameter is based on a height or a width of a current picture that comprises the current video block.

In another representative aspect, the disclosed technology may be used to provide a method for video processing. This method includes: clipping a temporary motion vector to generate a clipped motion vector; deriving a motion vector associated with a current video block of a video at least based on the clipped motion vector; and performing a conversion between the current video block of a video and a bitstream representation of the video based on the motion vector associated with the current video block, wherein the clipping of the temporary motion vector is based on at least one of a height (H) or a width (W) of a reference picture of the current video block, a top-left position (x0, y0) of the current video block, or a motion vector precision or an internal bit-depth (M) of the motion vector.

In another representative aspect, the disclosed technology may be used to provide a method for video processing. This method includes: performing a conversion between a current video block of a video and a bitstream representation of the video, wherein the conversion uses a scaling process to obtain motion vector differences of a first reference picture from motion vector differences from a second reference picture, and wherein the scaling process uses a clipping operation to constrain the motion vector differences of the first reference picture to fall in a range $[-((1<<(M-1))), (1<<(M-1))-1]$, where M is a number greater than 16.

In another representative aspect, the disclosed technology may be used to provide a method for video processing. This method includes: determining to use an internal bit-depth of one or more motion vectors for a conversion between a current video block of a video unit of a video and a bitstream representation of the video; and performing the conversion using the one or more motion vectors, wherein a syntax element at a video unit level indicates the internal bit-depth.

In another representative aspect, the disclosed technology may be used to provide a method for video processing. This method includes: determining to use an internal bit-depth of affine motion parameters for a conversion between a current video block of a video unit of a video and a bitstream representation of the video; and performing the conversion based on the determining, wherein the internal bit-depth of the affine motion parameters has a same range for non-affine motion parameters.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Figure 1:
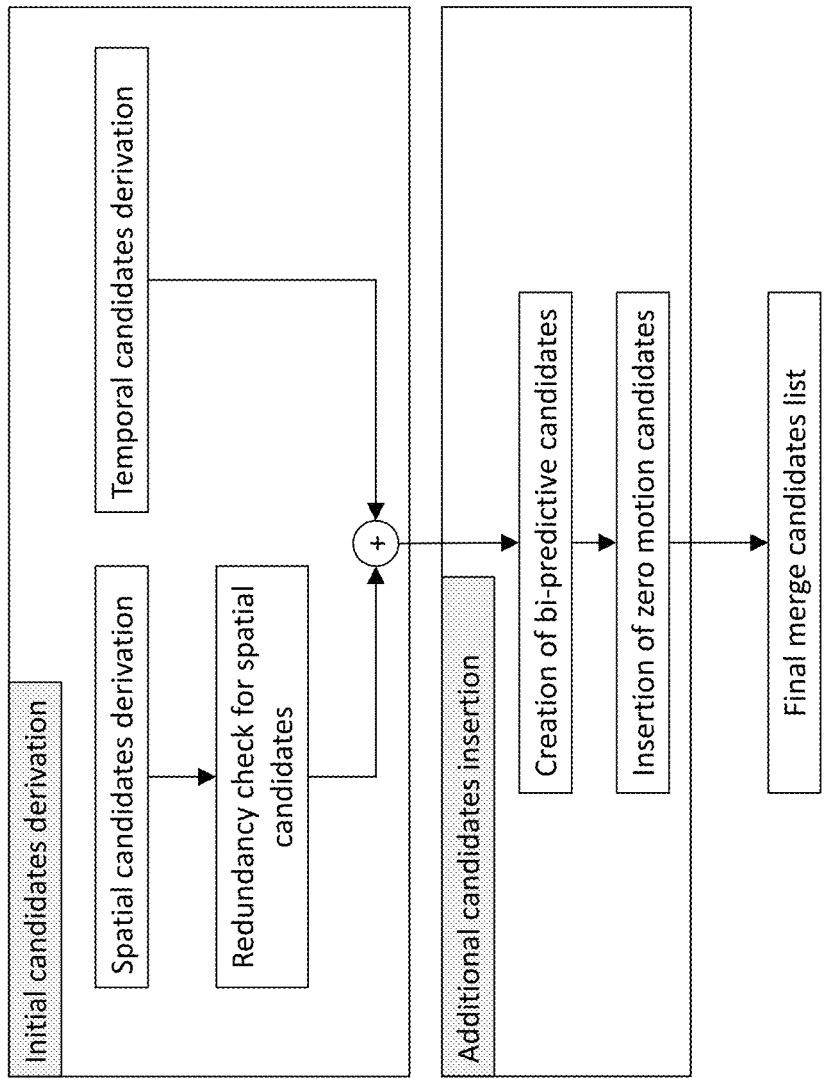
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or Motion Picture Experts Group (MPEG)-H Part 2) [1], the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1 Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices [2].

When signaling indicates that both of the reference picture lists are to be used, the PU is produced from two blocks of samples. This is referred to as 'bi-prediction'. Bi-prediction is available for B-slices only.

Reference Picture List

In HEVC, the term inter prediction is used to denote prediction derived from data elements (e.g., sample values or motion vectors) of reference pictures other than the current decoded picture. Like in H.264/Advanced Video Coding (AVC), a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
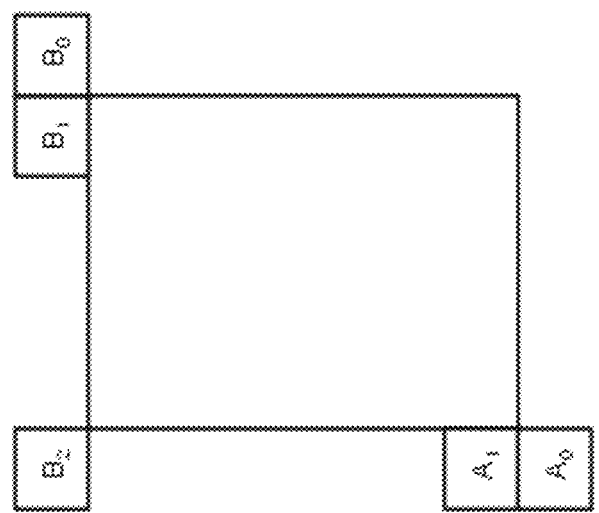
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
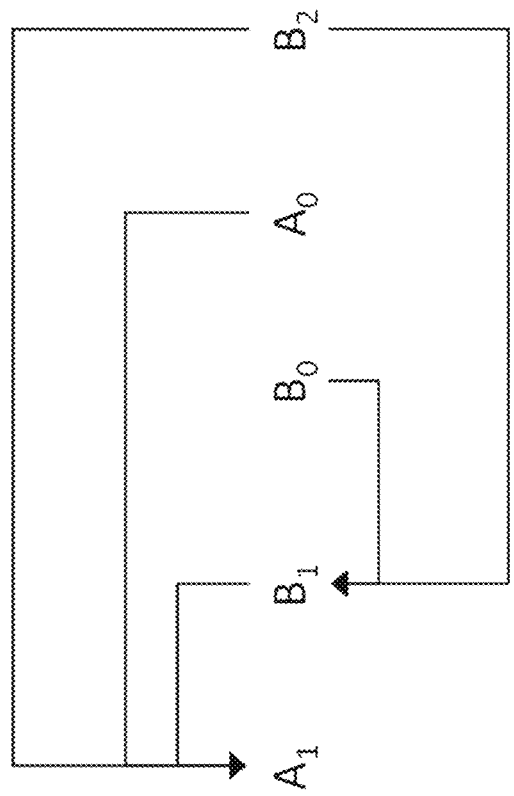
FIG. 3 shows an example of candidate pairs subject to a redundancy check of spatial merge candidates.
Figure 4B:
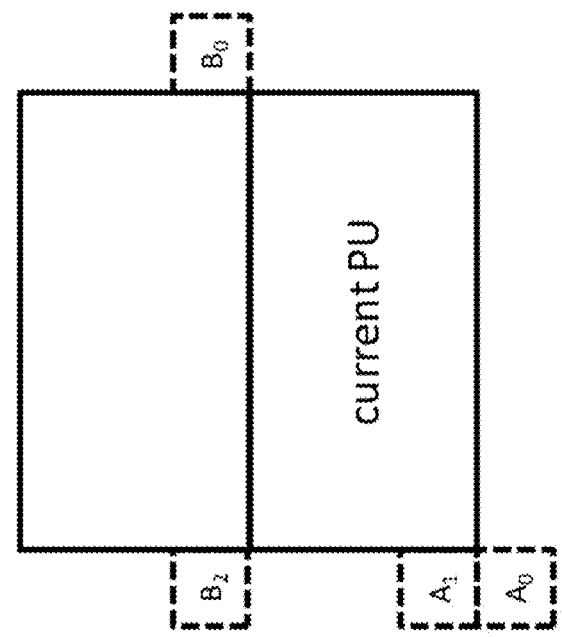
FIGS. 4A and 4B show examples of the position of a second prediction unit (PU) based on the size and shape of the current block.
Figure 4A:
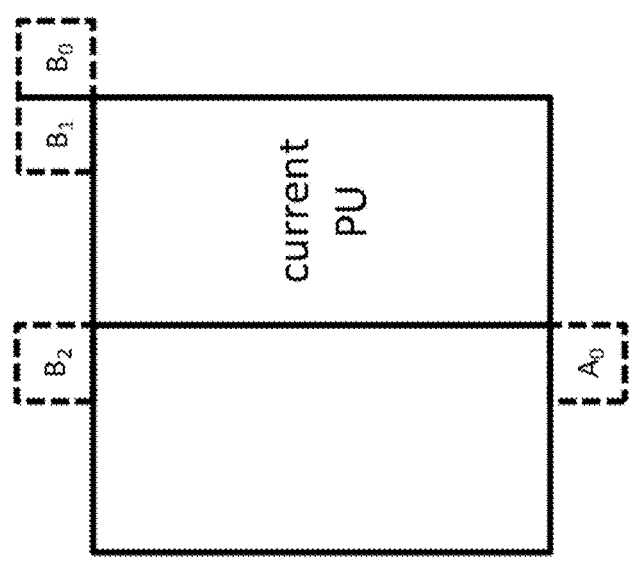

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest Picture Order Count (POC) difference with current picture within the given reference picture list. The reference picture list to be used for derivation of the co-located PU is explicitly signaled in the slice header.

Figure 5:
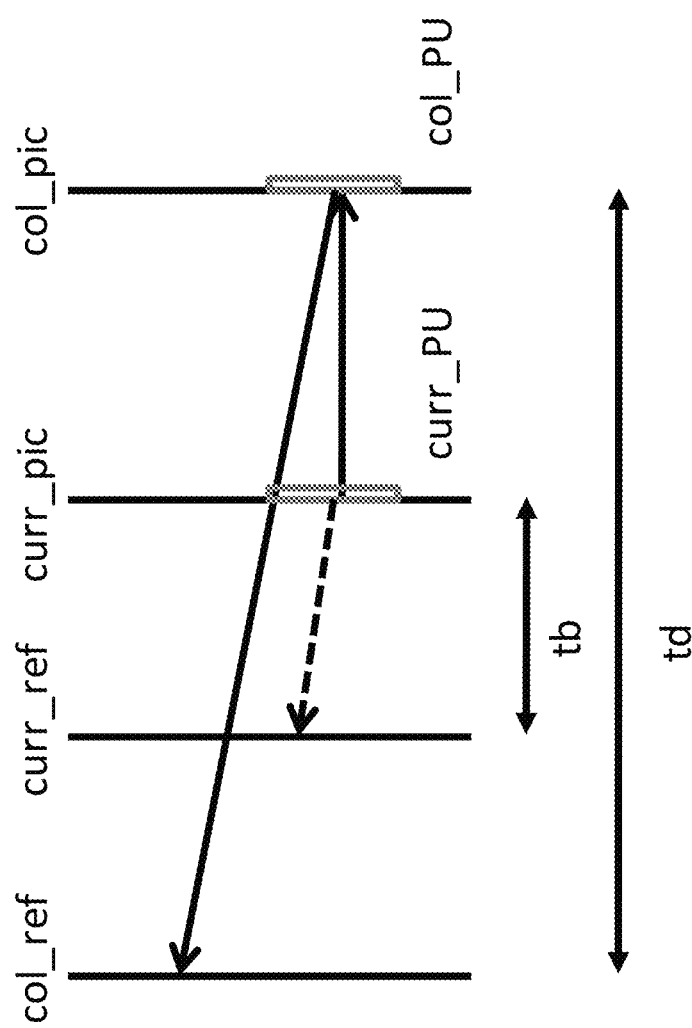
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B -slice, two motion vectors, one is for reference picture list 0 and the other is for reference picture list 1, are obtained and combined to make the bi-predictive merge candidate.

Figure 6:
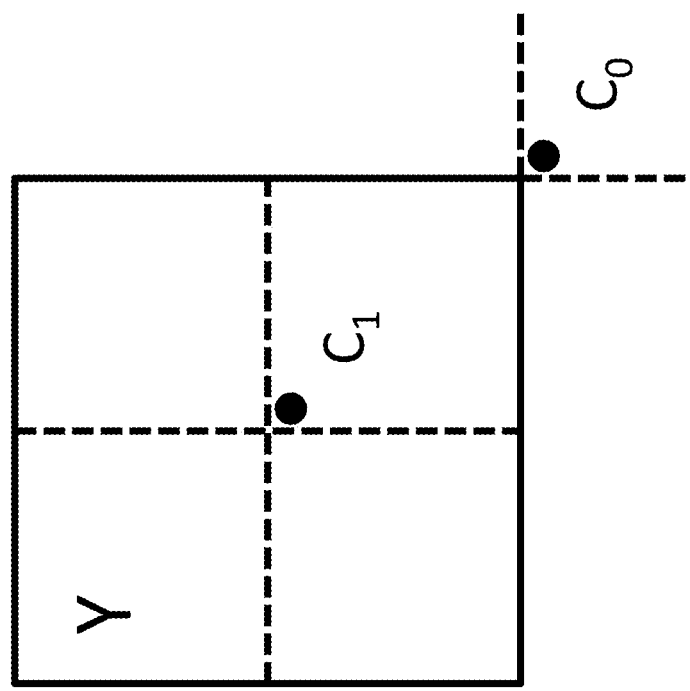
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
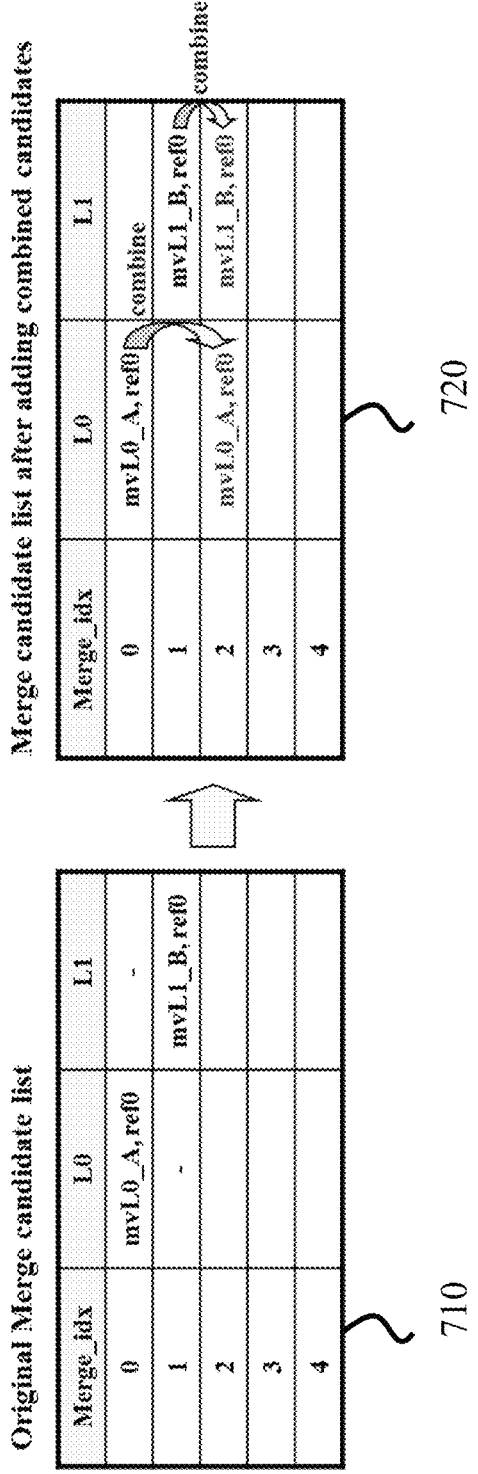
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Deriving AMVP Candidates

Figure 8:
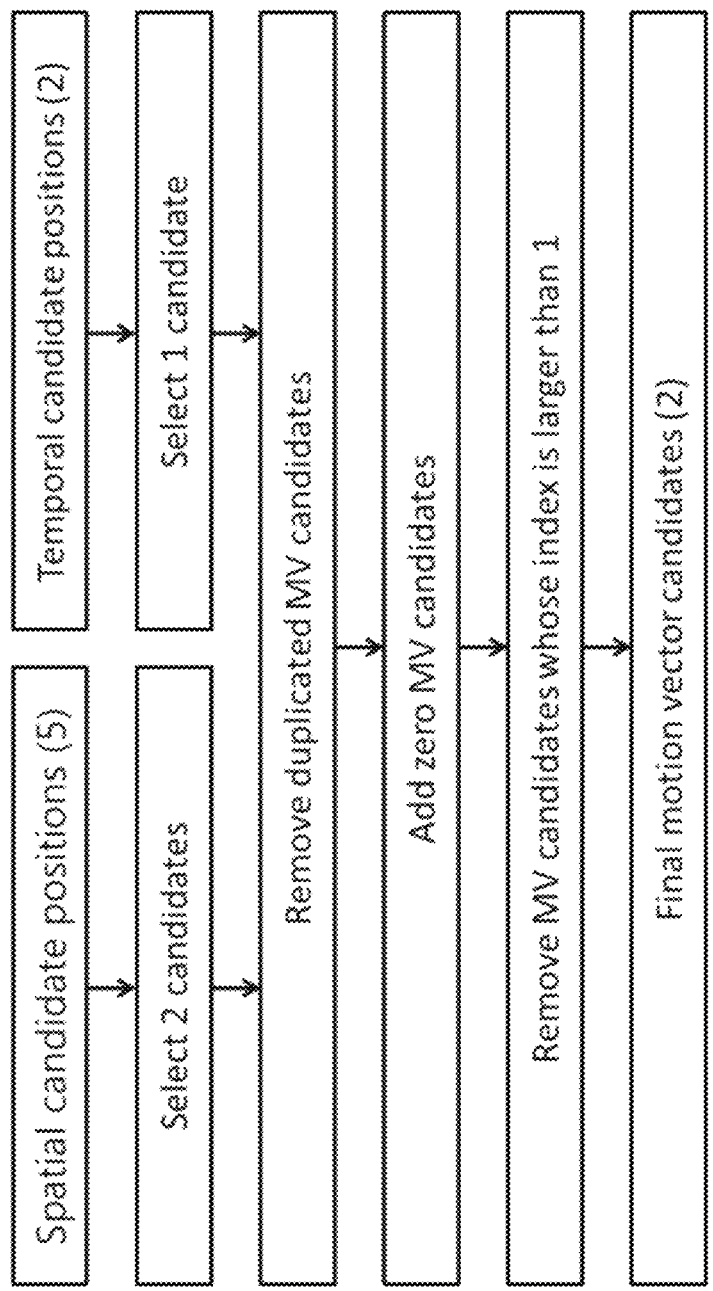
FIG. 8 shows an example of constructing motion vector prediction candidates.

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
(1) Same reference picture list, and same reference picture index (same POC)
(2) Different reference picture list, but same reference picture (same POC)

Spatial scaling
(3) Same reference picture list, but different reference picture (different POC)
(4) Different reference picture list, and different reference picture (different POC)

The no-spatial-scaling cases are checked first followed by the cases that allow spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
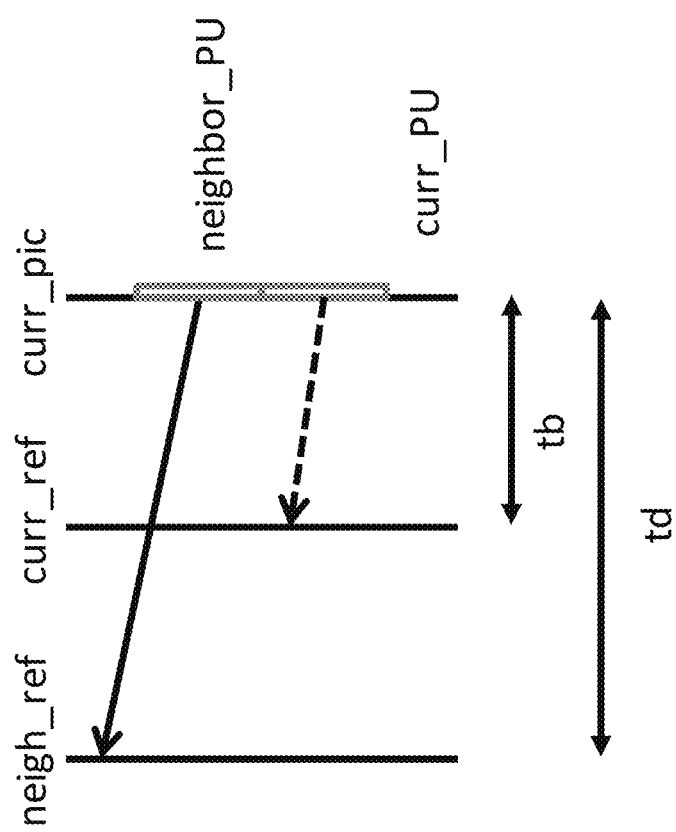
FIG. 9 shows an example of motion vector scaling for spatial motion vector candidates.

As shown in the example in FIG. 9, for the spatial scaling case, the motion vector of the neighboring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM) [3][4]. In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. The ATMVP method is also known as SbTMVP (sub-block temporal motion vector prediction). In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
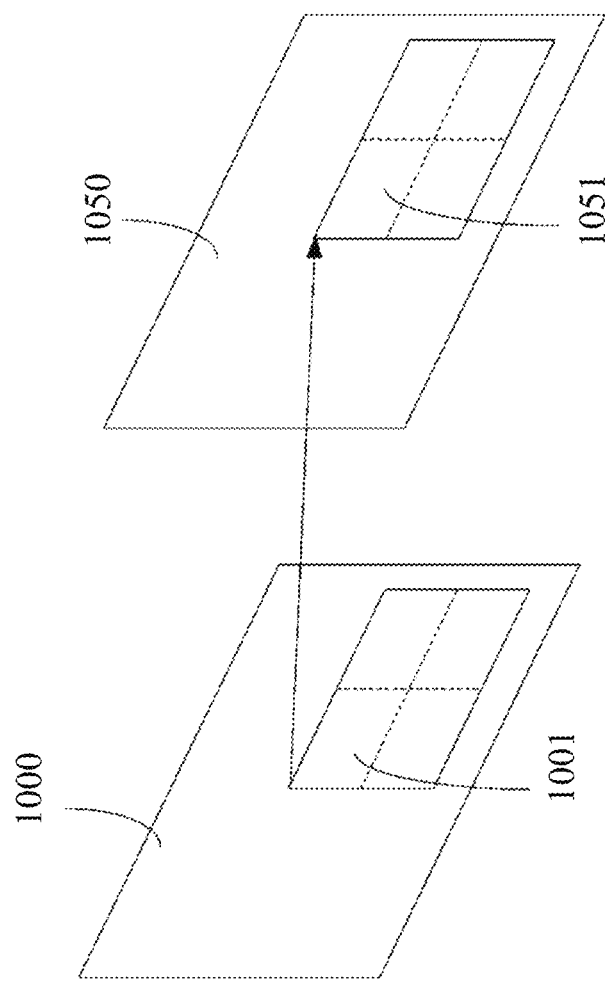
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

2.1.2 Examples of Spatial-Temporal Motion Vector Prediction (STMVP)

Figure 11:
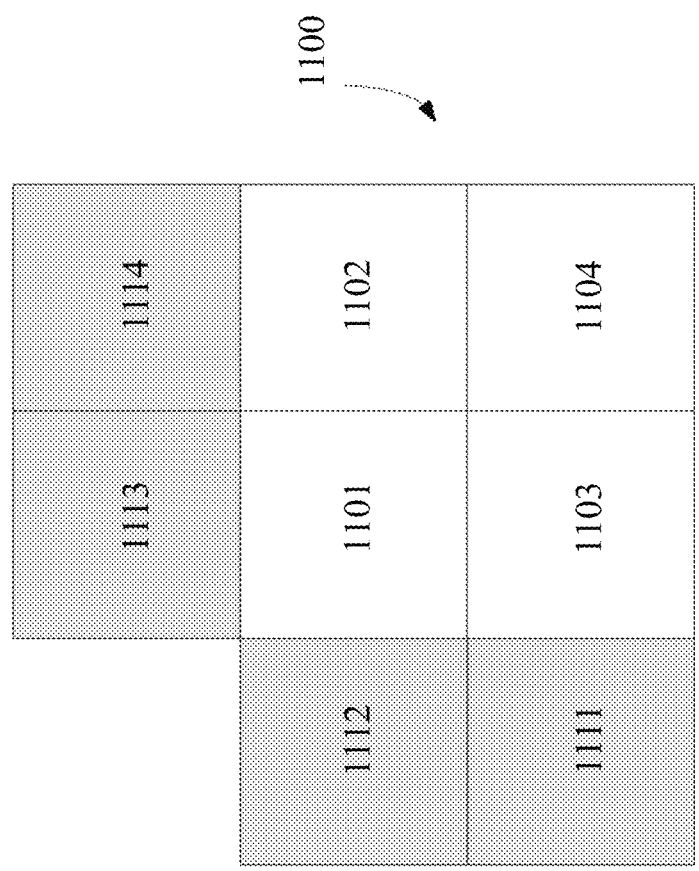
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more Rate Distortion (RD) checks may be needed for the two additional merge candidates. In some embodiments, e.g., JEM, all bins of the merge index are context coded by Context-based Adaptive Binary Arithmetic Coding (CABAC). In other embodiments, e.g., HEVC, only the first bin is context coded and the remaining bins are context by-pass coded.

2.2 Example of Inter Prediction Methods in Versatile Video Coding (VVC)

There are several new coding tools for inter prediction improvement, such as Adaptive motion vector difference resolution (AMVR) for signaling MVD, affine prediction mode, Triangular prediction mode (TPM), ATMVP, Generalized Bi-Prediction (GBI), Bi-directional Optical flow (BIO).

2.2.1 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.2.2 Examples of Affine Motion Compensation Prediction

Figure 12A:
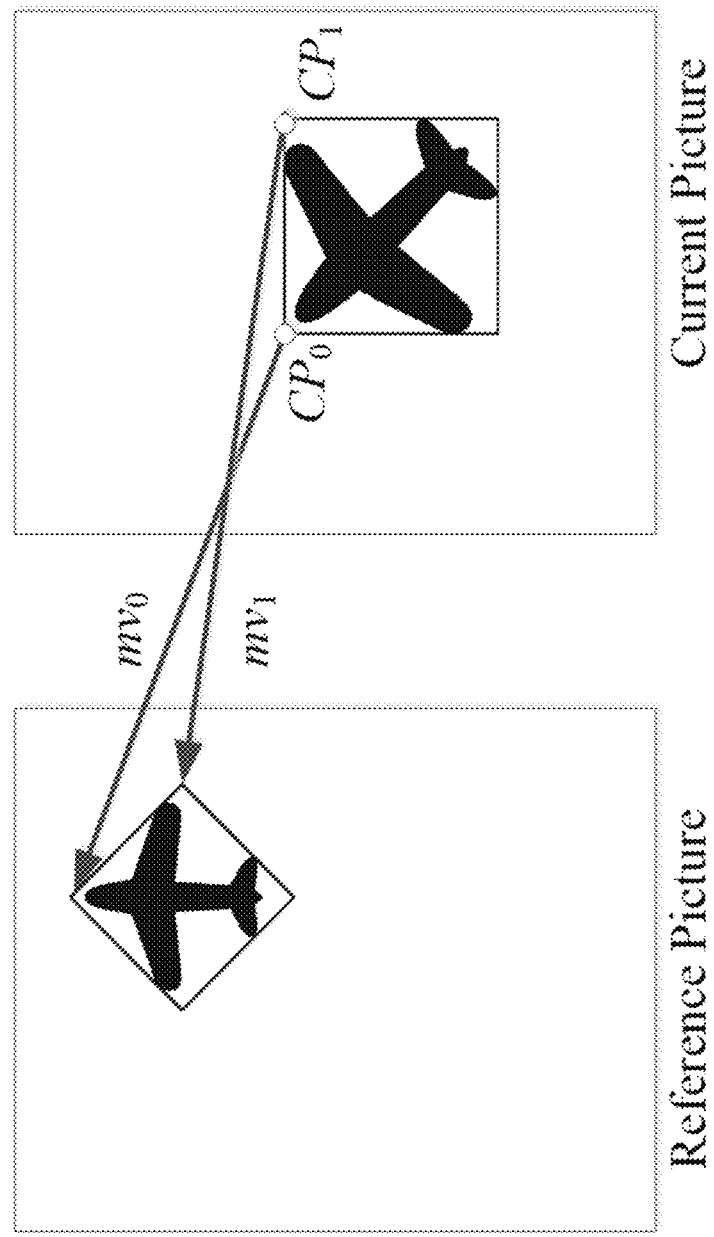
FIGS. 12A and 12B show examples of the simplified 4-parameter affine model and the simplified 6-parameter affine model, respectively.
Figure 12B:
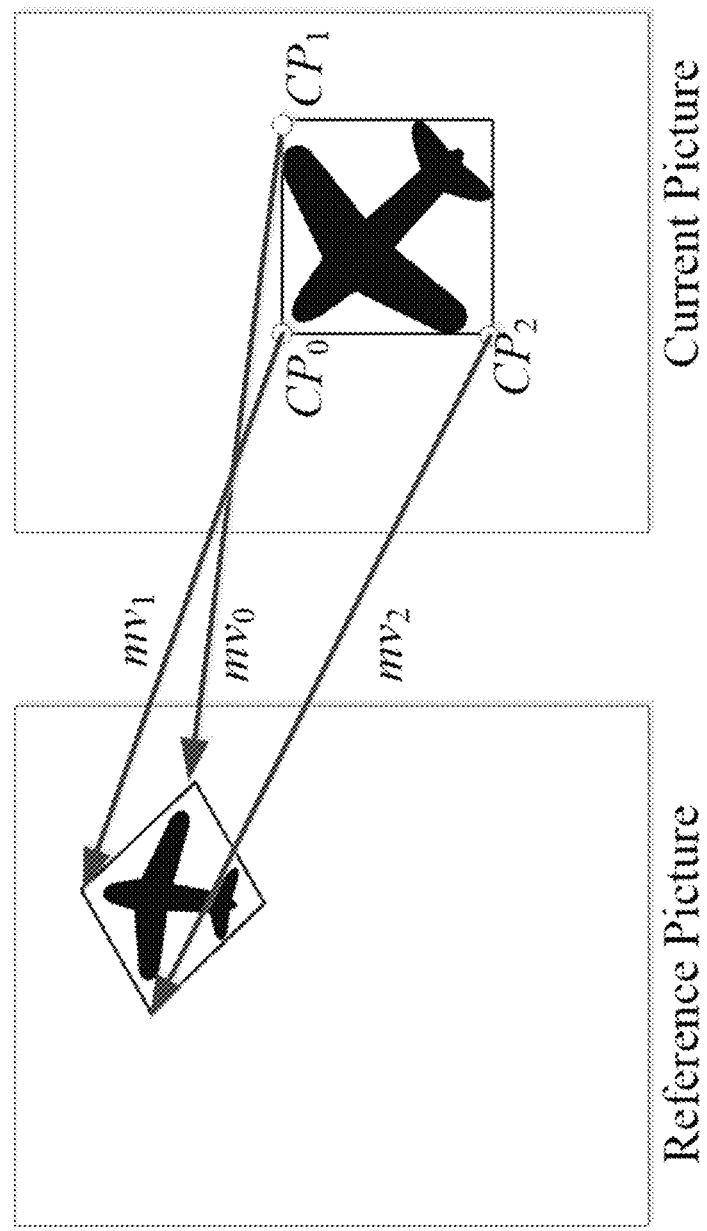

In HEVC, only a translation motion model is applied for motion compensation prediction (MCP). However, the camera and objects may have many kinds of motion, e.g. zoom in/out, rotation, perspective motions, and/or other irregular motions. In VVC, a simplified affine transform motion compensation prediction is applied with 4-parameter affine model and 6-parameter affine model. As shown in FIGS. 12A and 12B, the affine motion field of the block is described by two (in the 4-parameter affine model that uses the variables a, b, e and f) or three (in the 6-parameter affine model that uses the variables a, b, c, d, e and f) control point motion vectors, respectively.

The motion vector field (MVF) of a block is described by the following equation with the 4-parameter affine model and 6-parameter affine model respectively:

$$\begin{cases} mv^h(x, y) = ax - by + e = \dfrac{(mv_1^h - mv_0^h)}{w}x - \dfrac{(mv_1^v - mv_0^v)}{w}y + mv_0^h \\ mv^v(x, y) = bx + ay + f = \dfrac{(mv_1^v - mv_0^v)}{w}x + \dfrac{(mv_1^h - mv_0^h)}{w}y + mv_0^v \end{cases} \quad \text{Eq. (1)}$$

$$\begin{cases} mv^h(x, y) = ax + cy + e = \dfrac{(mv_1^h - mv_0^h)}{w}x + \dfrac{(mv_2^h - mv_0^h)}{h}y + mv_0^h \\ mv^v(x, y) = bx + dy + f = \dfrac{(mv_1^v - mv_0^v)}{w}x + \dfrac{(mv_2^v - mv_0^v)}{h}y + mv_0^v \end{cases} \quad \text{Eq. (2)}$$

Herein, $(mv^h_0, mv^h_0)$ is motion vector of the top-left corner control point (CP), and $(mv^h_1, mv^h_1)$ is motion vector of the top-right corner control point and $(mv^h_2, mv^h_2)$ is motion vector of the bottom-left corner control point, (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VVC test model (VTM), the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (e.g., 4×4 in VTM), the representative point is utilized to derive the motion vector for the whole sub-block.

Figure 13:
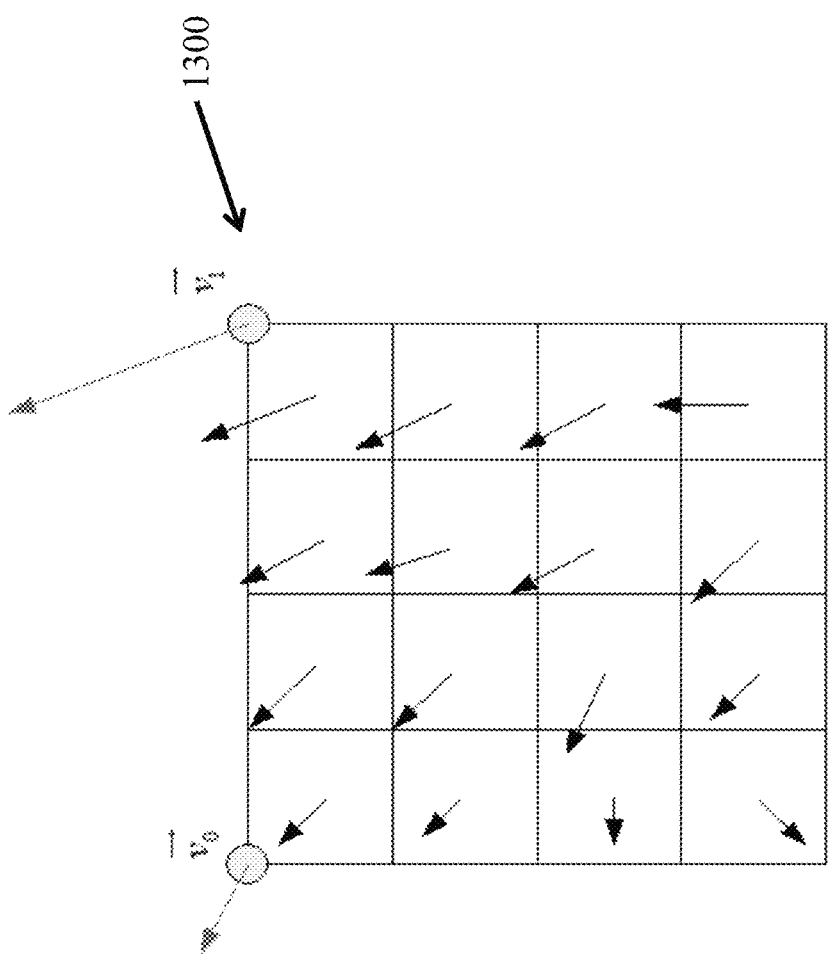
FIG. 13 shows an example of an affine motion vector field (MVF) per sub-block.

FIG. 13 shows an example of affine MVF per sub-block for a block 1300, wherein in order to further simplify the motion compensation prediction, sub-block based affine transform prediction is applied. To derive motion vector of each M×N sub-block, the motion vector of the center sample of each sub-block can be calculated according to Eqs. (1) and (2), and rounded to the motion vector fraction accuracy (e.g., 1/16 in JEM). Then the motion compensation interpolation filters can be applied to generate the prediction of each sub-block with derived motion vector. The interpolation filters for 1/16-pel are introduced by the affine mode. After the MCP, the high accuracy motion vector of each sub-block is rounded and saved as the same accuracy as the normal motion vector.

2.2.3 Examples for Signaling of Affine Prediction

Similar to the translational motion model, there are also two modes for signaling the side information due affine prediction. They are AFFINE_INTER and AFFINE_MERGE modes.

2.2.4 Examples of AF_INTER Mode

For CUs with both width and height larger than 8, AF_INTER mode can be applied. An affine flag in CU level is signaled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 16) and the estimated CPMVs are signalled. In addition, the index of affine AMVP candidate from which the estimated CPMVs are derived is further signalled.

1) Inherited Affine Motion Predictors

Figure 15:
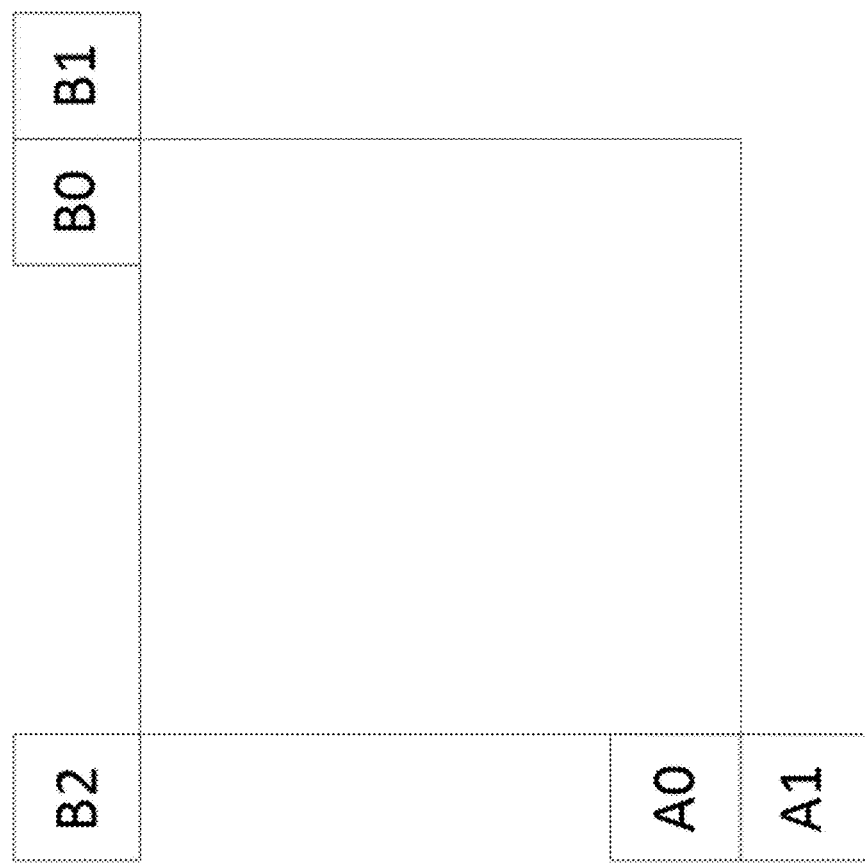
FIG. 15 shows an example of motion vector prediction for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 15.

Figure 17A:
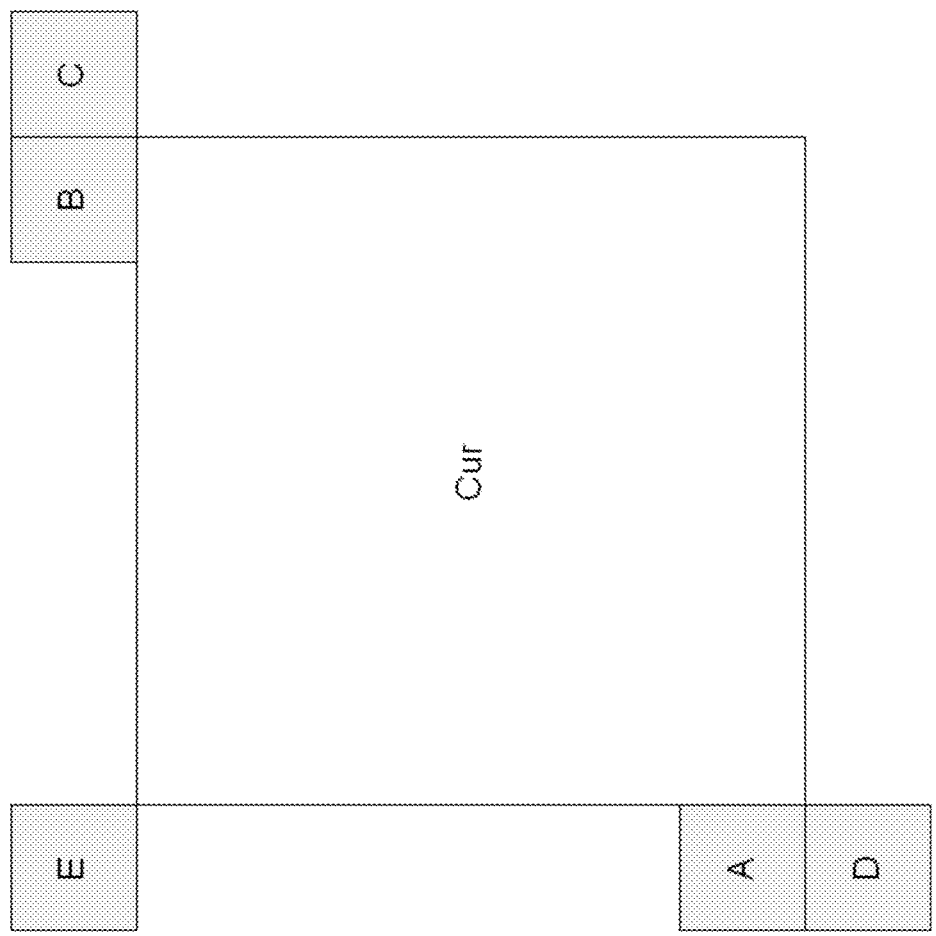
FIGS. 17A and 17B show example candidate blocks and the CPMV predictor derivation, respectively, for the AF_MERGE mode.
Figure 17B:
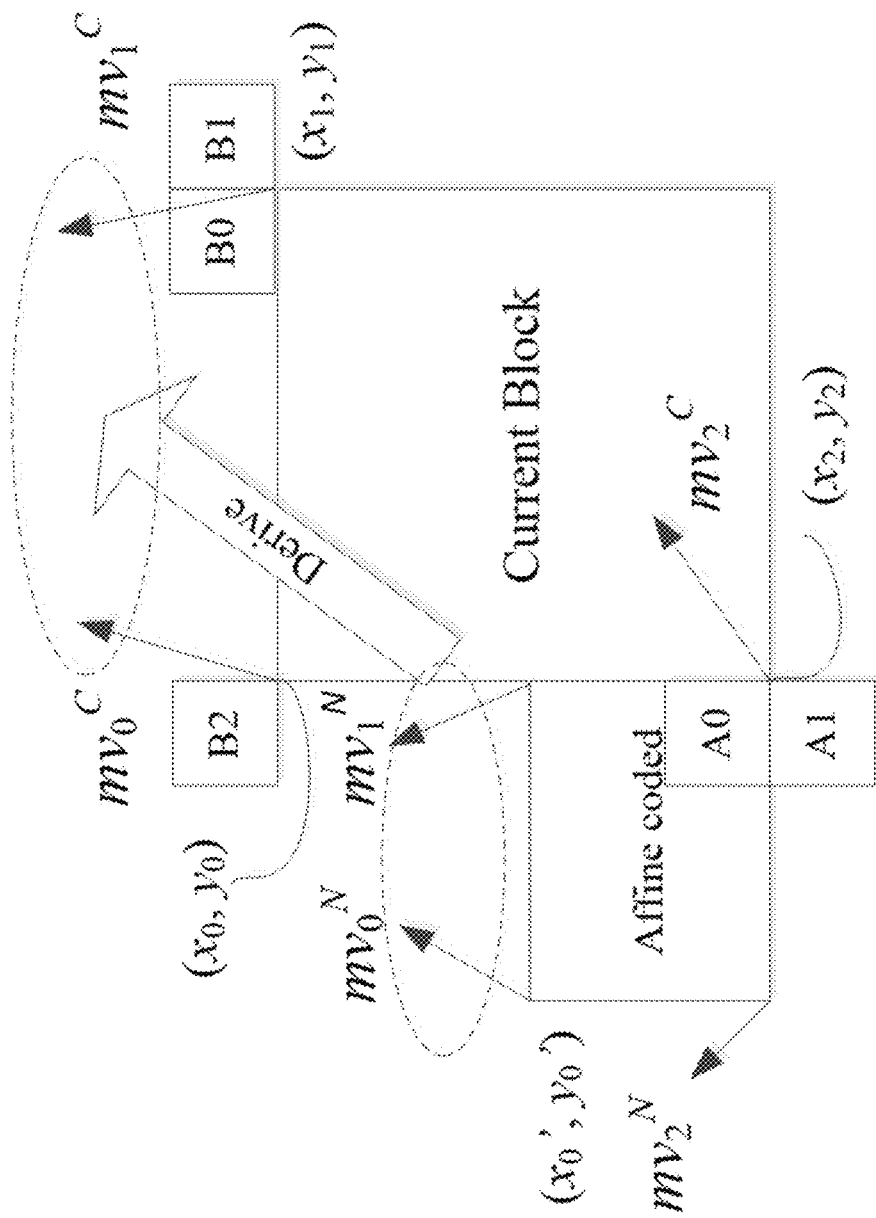

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 17B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 16:
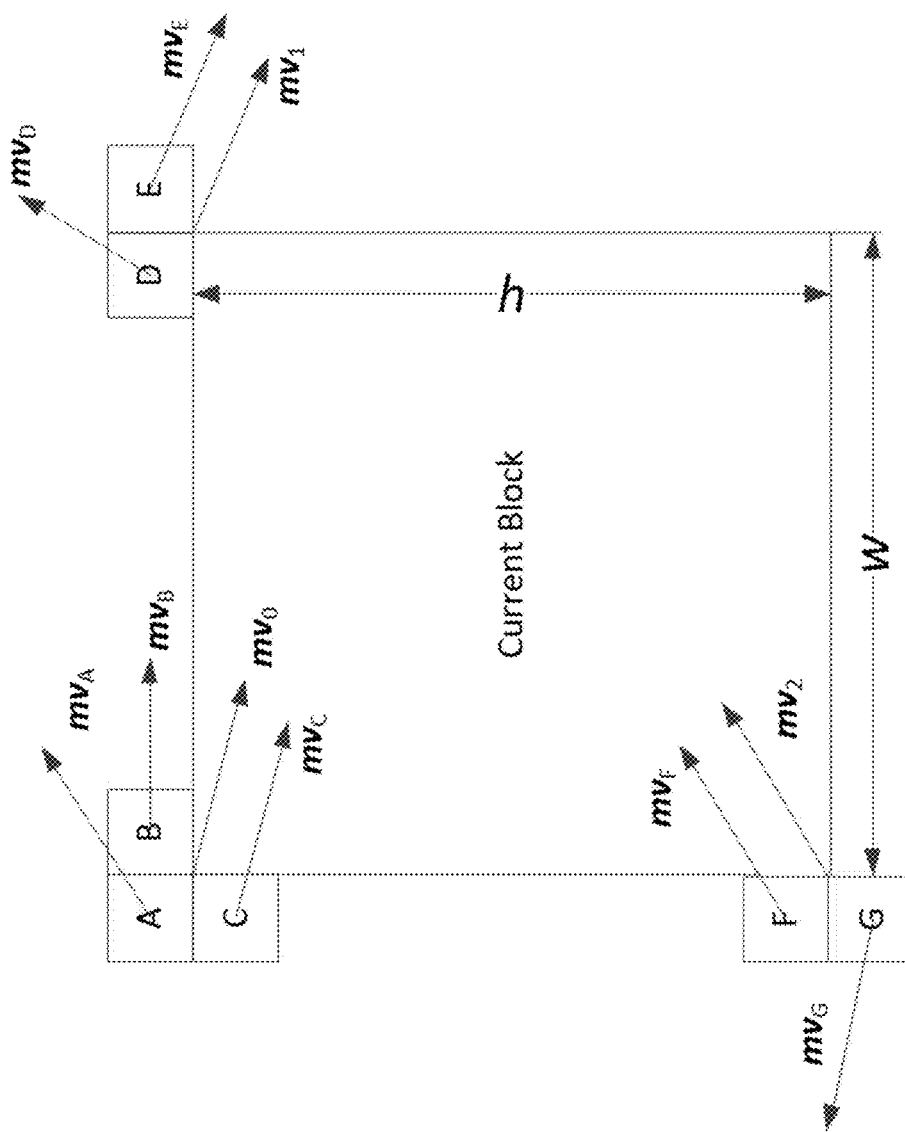
FIG. 16 shows an example of motion vector prediction for AF_INTER for constructed affine candidates.

A constructed affine motion predictor consists of control-point motion vectors (CPMVs) that are derived from neighboring inter coded blocks, as shown in FIG. 16, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

- If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.
- If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.
2) Derive an affine motion predictor by setting all CPMVs equal to $\overline{mv}_1$ if available.
3) Derive an affine motion predictor by setting all CPMVs equal to $\overline{mv}_0$ if available.
4) Derive an affine motion predictor by setting all CPMVs equal to HEVC TMVP if available.
5) Derive an affine motion predictor by setting all CPMVs to zero MV.

Note that $\overline{mv}_i$ is already derived in constructed affine motion predictor.

Figure 14B:
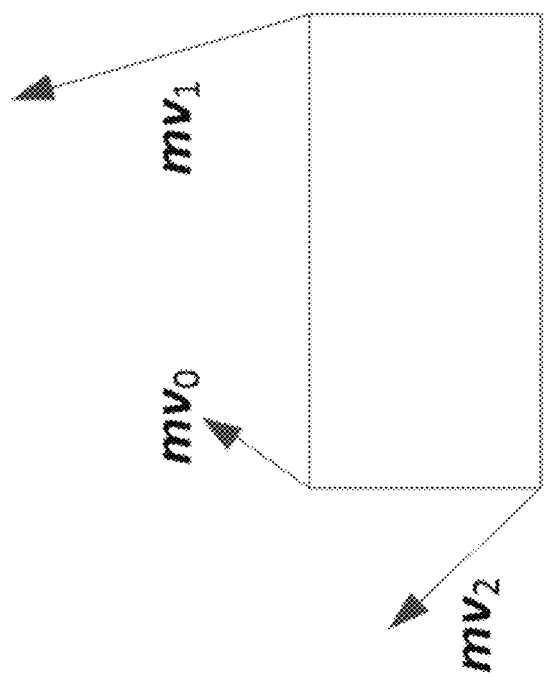
FIGS. 14A and 14B show examples of the 4-parameter and 6-parameter affine models, respectively.
Figure 14A:
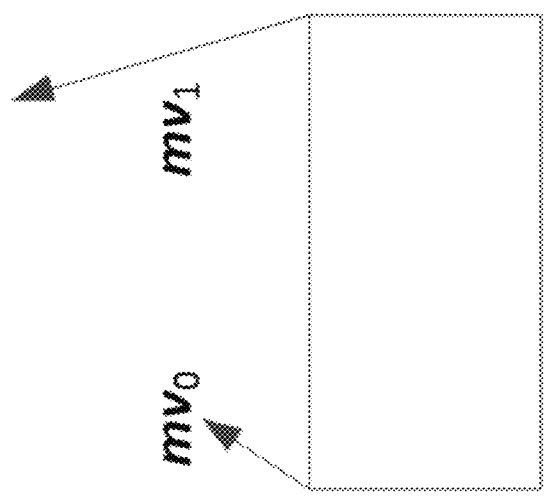

In AF_INTER mode, when 4/6 parameter affine mode is used, 2/3 control points are required, and therefore 2/3 MVD needs to be coded for these control points, as shown in FIGS. 14A and 14B. In an existing implementation [5], the MV may be derived as follows, e.g., it predicts $mvd_1$ and $mvd_2$ from $mvd_0$.

$$mv_0 = \overline{mv}_0 + mvd_0$$

$$mv_1 = \overline{mv}_1 + mvd_1 mvd_0$$

$$mv_2 = \overline{mv}_2 + mvd_2 + mvd_0$$

Herein, $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 14B. In some embodiments, the addition of two motion vectors (e.g., mvA(xA, yA) and mvB(xB, yB)) is equal to summation of two components separately. For example, newMV=mvA+mvB implies that the two components of newMV are set to (xA+xB) and (yA+yB), respectively.

2.2.5 Examples of AF_MERGE Mode

When a CU is applied in AF_MERGE mode, it gets the first block coded with an affine mode from the valid neighboring reconstructed blocks. And the selection order for the candidate block is from left, above, above right, left bottom to above left as shown in FIG. 17A (denoted by A, B, C, D, E in order). For example, if the neighbour left bottom block is coded in affine mode as denoted by A0 in FIG. 17B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU v0 and v1 are computed according to the affine motion model in Eqs. (1) and (2), the MVF of the current CU can be generated. In order to identify whether the current CU is coded with AF_MERGE mode, an affine flag can be signaled in the bitstream when there is at least one neighboring block is coded in affine mode.

In some embodiments (e.g., Joint Video Experts Team (JVET)-L0142 and JVET-L0632), an affine merge candidate list may be constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

Figure 18:
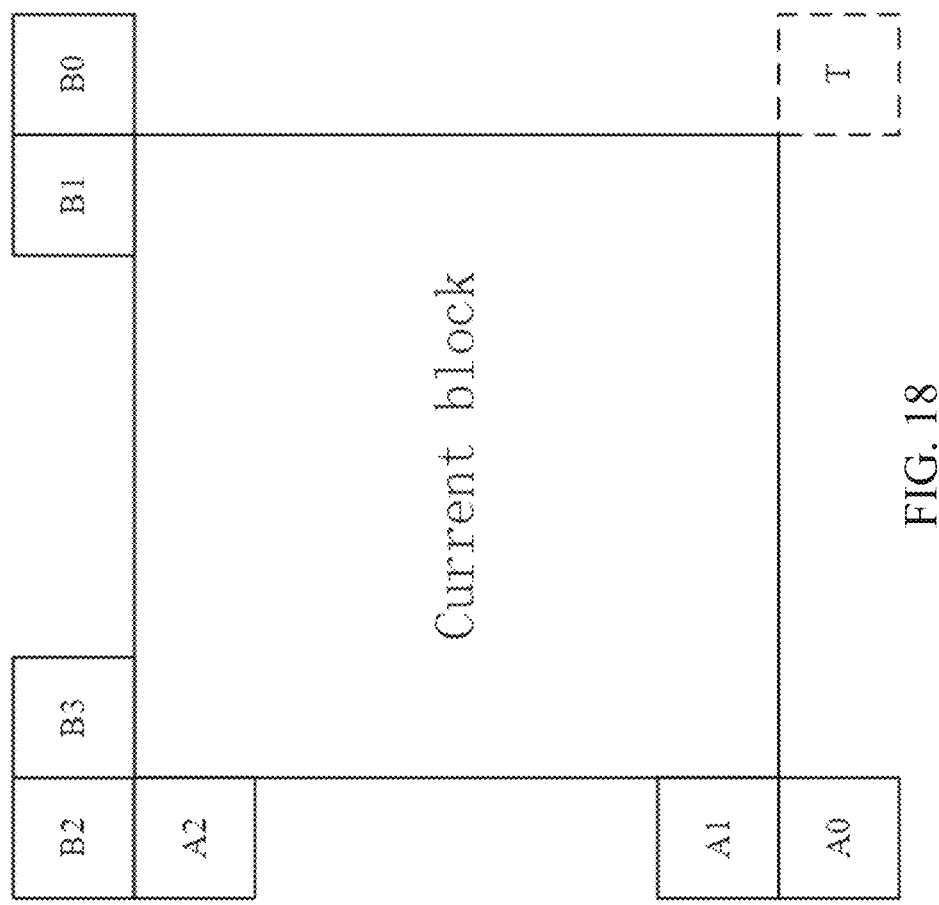
FIG. 18 shows an example of candidate positions for affine merge mode.
Figure 19:
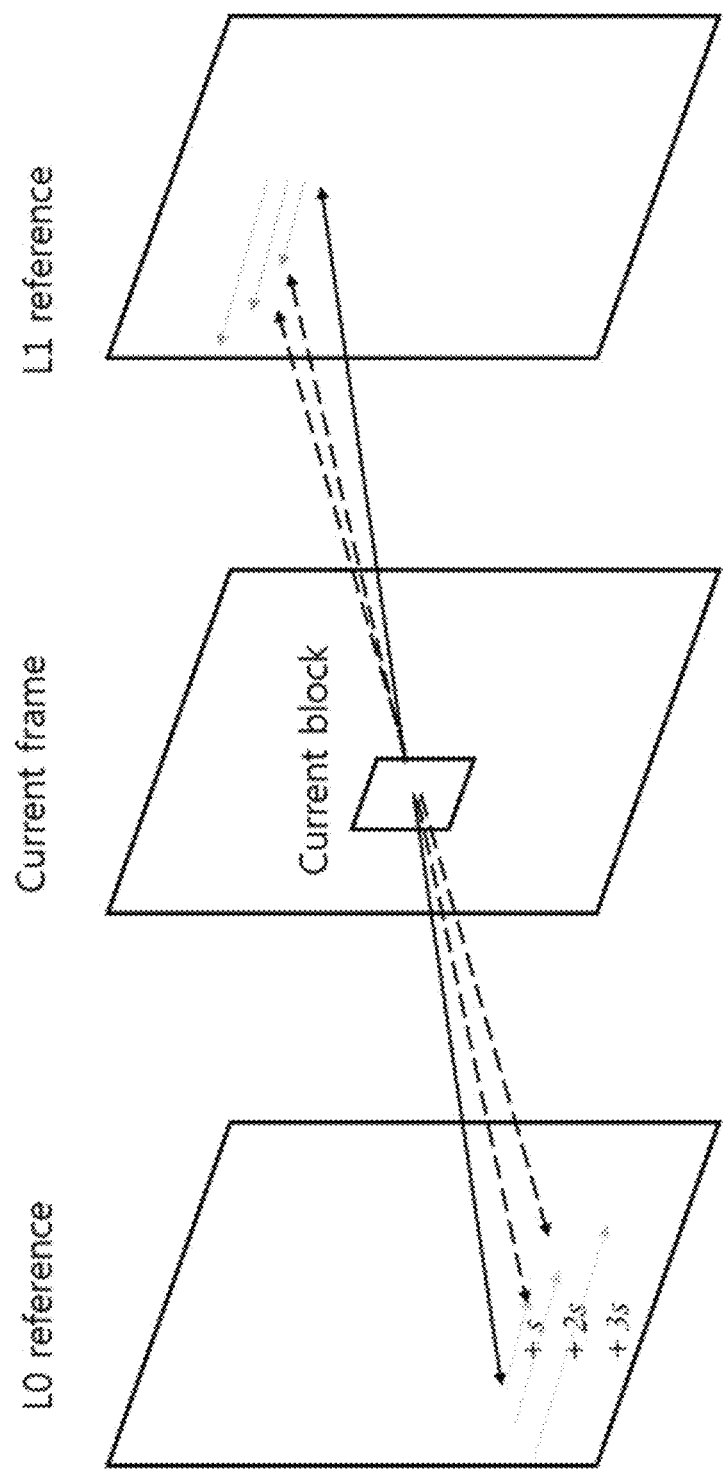
FIG. 19 shows an example of an UMVE search process.
Figure 20:
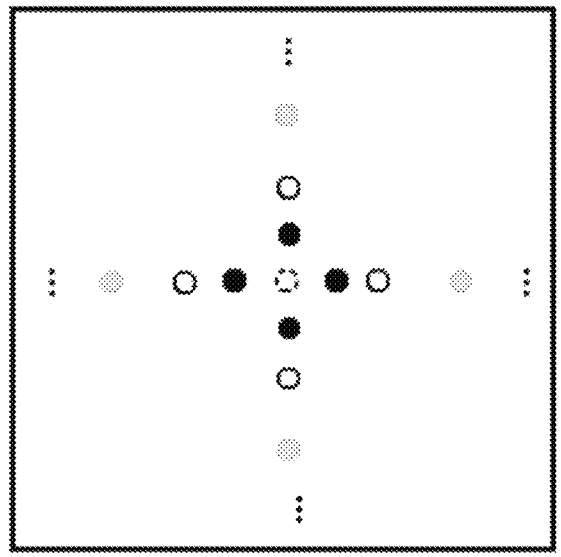
FIG. 20 shows an example of an UMVE search point.
Figure 20:
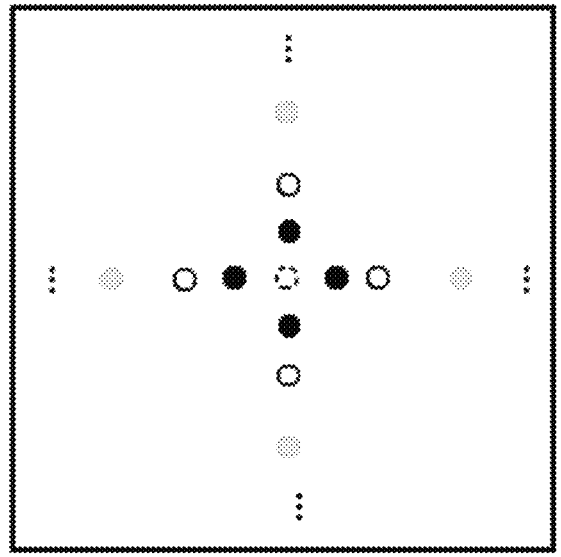

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

a) The motion information for the control points is derived firstly from the specified spatial neighbors and temporal neighbor shown in FIG. 18. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

For CP4, T is used.

b) Secondly, the combinations of controls points are used to construct an affine merge candidate.

I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

II. Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

III. The combinations of constructed affine candidates are inserted into to candidate list as following order: {CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4} i. For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

3) Padding with Zero Motion Vectors

If the number of candidates in affine merge candidate list is less than 5, zero motion vectors with zero reference indices are insert into the candidate list, until the list is full.

More specifically, for the sub-block merge candidate list, a 4-parameter merge candidate with MVs set to (0, 0) and prediction direction set to uni-prediction from list 0 (for P slice) and bi-prediction (for B slice).

2.2.6 Examples of Sub-Block Sizes for Chroma Affine Coded Blocks

In the proposal JVET-L0265, adopted by VTM3.0, the chroma sub-block size is modified from 2×2 to 4×4. The MV of a 4×4 chroma sub-block is calculated as the average of the MVs of the four corresponding 4×4 luma sub-blocks. With the expanded sub-block size, the bandwidth in the worst case is reduced; e.g., MV_Chroma=Average (clipped(MV_luma0)+clipped (MV_luma1)+clipped(MV luma2)+clipped (MV_luma3))

2.4 Examples of Merge with Motion Vector Differences (MMVD)

In JVET-L0054, ultimate motion vector expression ((UMVE), also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| | Base candidate IDX | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2

| | Distance IDX | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| | Direction IDX | | | |
|---|---|---|---|---|
| Direction IDX | 00 | 01 | 10 | 11 |
| x-axis | + | − | N/A | N/A |
| y-axis | N/A | N/A | + | − |

In some embodiments, the UMVE flag is signaled right after sending a skip flag or merge flag. If skip or merge flag is true, UMVE flag is parsed. If UMVE flage is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

2.5 Details for the MVD Derivation Process

The following text are from JVET-L1001-v6.

The luma merge motion vector differences mMvdL0 and mMvdL1 are derived as follows:

- If both predFlagL0 and predFlagL1 are equal to 1, the following applies:
  - currPocDiffL0 = DiffPicOrderCnt( currPic, RefPicList0[ refIdxL0 ] )  (8-272)
  - currPocDiffL1 = DiffPicOrderCnt( currPic, RefPicList1[ refIdxL1 ] )  (8-273)
- If −currPocDiffL0 * currPocDiffL1 is greater than 0, the following applies:
  - mMvdL0[ 0 ] = MmvdOffset[ 0 ]  (8-274)
  - mMvdL0[ 1 ] = MmvdOffset[ 1 ]  (8-275)
  - mMvdL1[ 0 ] = −MmvdOffset[ 0 ]  (8-276)
  - mMvdL1[ 1 ] = −MmvdOffset[ 1 ]  (8-277)
- Otherwise ( −currPocDiffL0 * currPocDiffL1 is less than 0 ), the following applies:
  - mMvdL0[ 0 ] = MmvdOffset[ 0 ]  (8-278)
  - mMvdL0[ 1 ] = MmvdOffset[ 1 ]  (8-279)
  - mMvdL1[ 0 ] = MmvdOffset[ 0 ]  (8-280)
  - mMvdL1[ 1 ] = MmvdOffset[ 1 ]  (8-281)
  - If Abs( currPocDiffL0 ) is greater than Abs( currPocDiffL1 ), the following applies:
    - td = Clip3(−128, 127, currPocDiffL0 )  (8-282)
    - tb = Clip3(−128, 127, currPocDiffL1 )  (8-283)
    - tx = (16384 + ( Abs( td ) >> 1 ) )/td  (8-284)
    - distScaleFactor = Clip3(−4096, 4095, ( tb *tx + 32 ) >> 6 )  (8-285)
    - mMvdL1[0] = Clip3(−$2^{15}$, $2^{15}$ − 1, Sign( distScaleFactor * mMvdL1[ 0 ] ) *  (8-286)
       ( ( Abs( distScaleFactor * mMvdL1[ 0 ]) + 127 ) >> 8 ) )
    - mMvdL1[1] = Clip3(−$2^{15}$, $2^{15}$ − 1, Sign( distScaleFactor * mMvdL1[ 1 ] ) *  (8-287)
       ( ( Abs( distScaleFactor * mMvdL1[ 1 ] ) + 127 ) >> 8 ) )
  - Otherwise if Abs( currPocDiffL0 ) is less than Abs( currPocDiffL0), the following applies:
    - td = Clip3( −128, 127, currPocDiffL1 )  (8-288)
    - tb = Clip3( −128, 127, currPocDiffL0 )  (8-289)
    - tx = ( 16384 + ( Abs( td ) >> 1 ) )/td  (8-290)
    - distScaleFactor = Clip3( −4096, 4095, ( tb * tx + 32 ) >> 6 )  (8-291)
    - mMvdL0[ 0 ] = Clip3( −$2^{15}$, $2^{15}$ − 1, Sign( distScaleFactor * mMvdL0[ 0 ] ) *  (8-292)

```
        ( ( Abs( distScaleFactor * mMvdL0[ 0 ] ) + 127 ) >> 8 ) )
    mMvdL0[ 1 ] = Clip3(−2^15, 2^15 − 1, Sign( distScaleFactor * mMvdL0[ 1 ] ) *           (8-293)
        ( ( Abs( distScaleFactor * mMvdL0[ 1 ]) + 127 ) >> 8 ) )
- Otherwise ( predFlagL0 or predFlagL1 are equal to 1 ), the following applies for X being 0 and 1:
    mMvdLX[ 0 ] = ( predFlagLX = = 1 ) ? MmvdOffset[ 0 ] : 0                                (8-294)
    mMvdLX[ 1 ] = ( predFlagLX = = 1 ) ? MmvdOffset[ 1 ] : 0                                (8-295)
```

3 Drawbacks of Existing Implementations

In existing implementations (e.g., VTM-3.0), due to the increased MV precision to 1/16-pel, the original restriction of MV range is not meaningful especially for 8K resolution videos. In addition, for 4×4 sub-PU prediction (i.e. affine mode), the minimum chroma sub-block size is not limited to 4×4. Four luma motion vectors are averaged together to form a single motion vector for the corresponding chroma 4×4 sub-block. By clipping luma motion vectors before averaging to form chroma vectors (clip-then-average), every decoder would have to implement that clipping to get a match even for majority of cases MV are not exceeding the restricted ranges.

4 Example Methods for Selecting and Applying Motion Vector Ranges for Video Coding Embodiments of the presently disclosed technology overcome the drawbacks of existing implementations, thereby providing video coding with higher coding efficiencies. The selection and application of motion vector ranges for video coding, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined. It should be noted that some of the proposed technologies could be applied to existing candidate list construction process.

Example 1. It is proposed to use the originally derived luma motion vectors of multiple luma blocks (e.g., un-clipped) to derive the chroma motion vector of one chroma block. The 'block' may be defined as prediction unit, coding unit, a sub-block utilized in a prediction/coding unit coded with sub-block based technologies (e.g., affine, ATMVP). In some examples, the 'luma' and chroma' may be interpreted to Y color component and Cb/Cr color components. In some examples, the 'luma' and chroma' may be interpreted to G color component and B/R color components. In the following examples, 'sub-block' may be also replaced by the terminology 'block'.
  (a) In one example, how to derive sub-blocks' motion vectors of chroma components may depend on color formats such as 4:2:0, 4:2:2 or 4:4:4.
    i. In one example, the four M×N luma blocks' motion vectors are utilized to derive a M×N chroma block' motion vector. Alternatively, furthermore, it may be invoked under the condition of 4:2:0 color subsampling format.
    ii. In one example, the two M×N luma blocks' motion vectors are utilized to derive a M×N chroma block' motion vector. Alternatively, furthermore, it may be invoked under the condition of 4:2:2 color subsampling format.
    iii. In one example, the one M×N luma block's motion vector are utilized as the M×N chroma block' motion vector. Furthermore, it may be invoked under the 4:4:4 color format.
  (b) In one example, linear function of the multiple luma motion vectors may be applied to derive the chroma motion vector.
  (c) Alternatively, furthermore, the derived chroma motion vector may be further clipped before being utilized for motion compensation of the chroma block.
  (d) Above methods may be applied to sub-block based technologies, e.g., affine, ATMVP, STMVP etc. al. Alternatively, furthermore, M×N may denote the sub-block size and the multiple luma/chroma block may denote the multiple luma sub-blocks and one chroma sub-block.
  (e) In one example, for the affine mode, MV_Chroma may be set to the average of four corresponding luma blocks, such as Average (MV_luma0+MV_luma1+MV_luma2+MV_luma3).
  (f) The above mentioned Luma/Chroma components may refer to Y/Cb/Cr, or other color representations such as G/R/B.

Example 2. It is proposed to restrict the MV ranges based on the MV precisions.
  (a) In one example, different MV ranges may be defined based on the usage of AMVR, and it could be different for different profiles/levels.
  (b) MV ranges may be different for different modes, such as affine or non-affine.
  (c) When the restricted range is different, the clipping of motion vectors may be applied with different input parameters (i.e., based on the range).

Example 3. The internal bit-depth of motion vectors may be increased to M bits (e.g., M>16).
  (a) In one example, for the AMVP process, when motion vector prediction candidate is derived from a motion vector associated with a different reference picture from the target reference picture, each component of the motion vector may be scaled to the target reference picture with the range of [−((1<<(M-1))), (1<<(M-1))-1]. In one implementation, M is set to 18 and the range of [−((1<<(M-1))), (1<<(M-1))-1] is [−131072, 131071].
  (b) In one example, for the TMVP process for either AMVP/merge mode and/or ATMVP/STMVP, when motion vector prediction candidate is derived from a motion vector associated with a temporal reference picture from the target reference picture, the motion vector may be scaled to the target reference picture with the range of [−((1<<(M-1))), (1<<(M-1))-1].
  (c) In one example, for the MVD derivation process for MMVD, when MVD of one reference picture list is scaled to another reference picture list, the scaled MVD may be restricted to be with the range of [−((1<<(M-1))), (1<<(M-1))-1].

(d) In one example, above methods may be invoked when affine is enabled for a sequence/picture/slice/tile.

Example 4. MV precision (e.g., used for MV storage, internal MV precision) may be signaled from encoder to decoder in VPS/PPS/Slice header/tile group/tile/CTU row/CTU.
 (a) MV precision may be different in different standard profiles/levels/tiers.

Example 5. The internal bit-depth of MVs may be signaled from encoder to decoder in VPS/PPS/Slice header/tile group/tile/CTU row/CTU.
 (a) The internal bit-depth of MVs may be different in different standard profiles/levels/tiers.

Example 6. MV precision may depend on picture width and/or height.

Example 7. The internal bit-depth of MVs may depend on picture width and/or height.

Example 8. In one example, the clipping of a MV component may depend on the dimensions of the reference picture, the top-left position of the current block, the MV precision and the MV internal bit-depth.
 (a) For example, suppose the width and height of the reference picture is W and H, the top-left position of the current block is (x0, y0), MV precision is 1/(1<<Shift) sub-pixel (for example, 1/16 sub-pixel when Shift is equal to 4). CW and CH are the maximum width and maximum height of a CU/PU/video data processing unit, respectively. Then
  i. PicMinH=(−x0+1+Offset1)<<Shift; or PicMinH=(−x0+Offset1)<<Shift;
  ii. PicMaxH=(W−1−x0+Offset2)<<Shift; or PicMaxH=(W−x0+Offset2)<<Shift;
  iii. PicMinV=(−y0+1+Offset3)<<Shift; or PicMinV=(−y0+Offset3)<<Shift;
  iv. PicMaxV=(H−1−y0+Offset4)<<Shift. or PicMaxV=(H−y0+Offset4)<<Shift.

Herein, Offset1, Offset2, Offset3 and Offset4 are offsets which may depend on padding methods. For example, Offset1=−CW-8, Offset3=−CH-8, Offset2=Offset4=8. Then MVMinH=max(PicMinH, −((1<<(M-1)))), MVMinV=max(PicMinV, −((1<<(M-1)))), MVMaxH=min(PicMaxH, ((1<<(M-1)))-1), and MVMaxV=min(PicMaxV, ((1<<(M-1)))-1).

The x-component of a MV may be clipped to be in the range [MVMinH, MVMaxH], and the y-component of a MV may be clipped to be in the range [MVMinV, MVMaxV].

Example 9. The internal bit-depth of affine motion vectors/affine motion vector predictors/control point motion vectors may be restricted to the same range as non-affine motion vectors.
 (a) In one example, the control point motion vectors may be restricted to be within the range [$-2^{15}$, $2^{15}-1$].

The examples described above may be incorporated in the context of the method described below, e.g., methods 2100 and 2200, which may be implemented at a video decoder or a video encoder.

Figure 21:
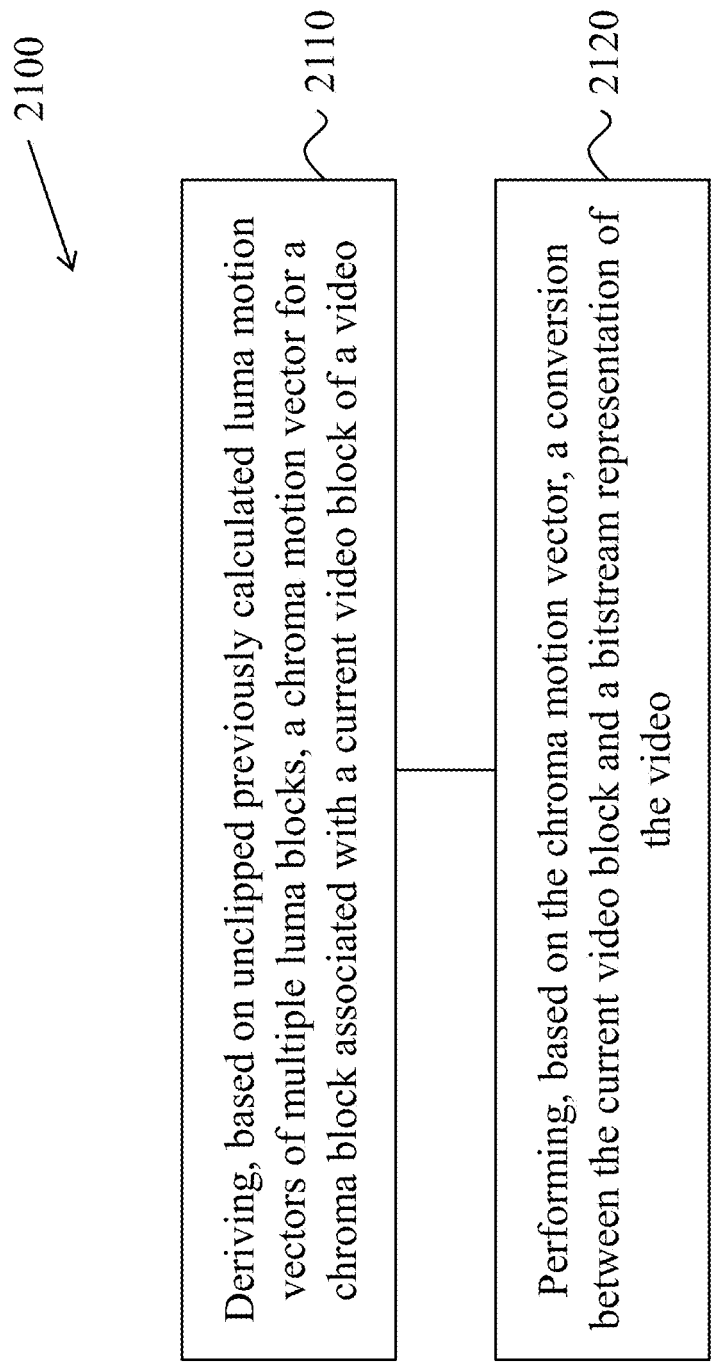
FIG. 21 shows a flowchart of an example method for video processing based on some implementations of the disclosed technology.

FIG. 21 shows a flowchart of an exemplary method for video processing. The method 2100 includes, at step 2110, deriving, based on unclipped previously calculated luma motion vectors of multiple luma blocks, a chroma motion vector for a chroma block associated with a current video block of a video. The method 2100 includes, at step 2120, performing, based on the chroma motion vector, a conversion between the current video block and a bitstream representation of the video.

Figure 22A:
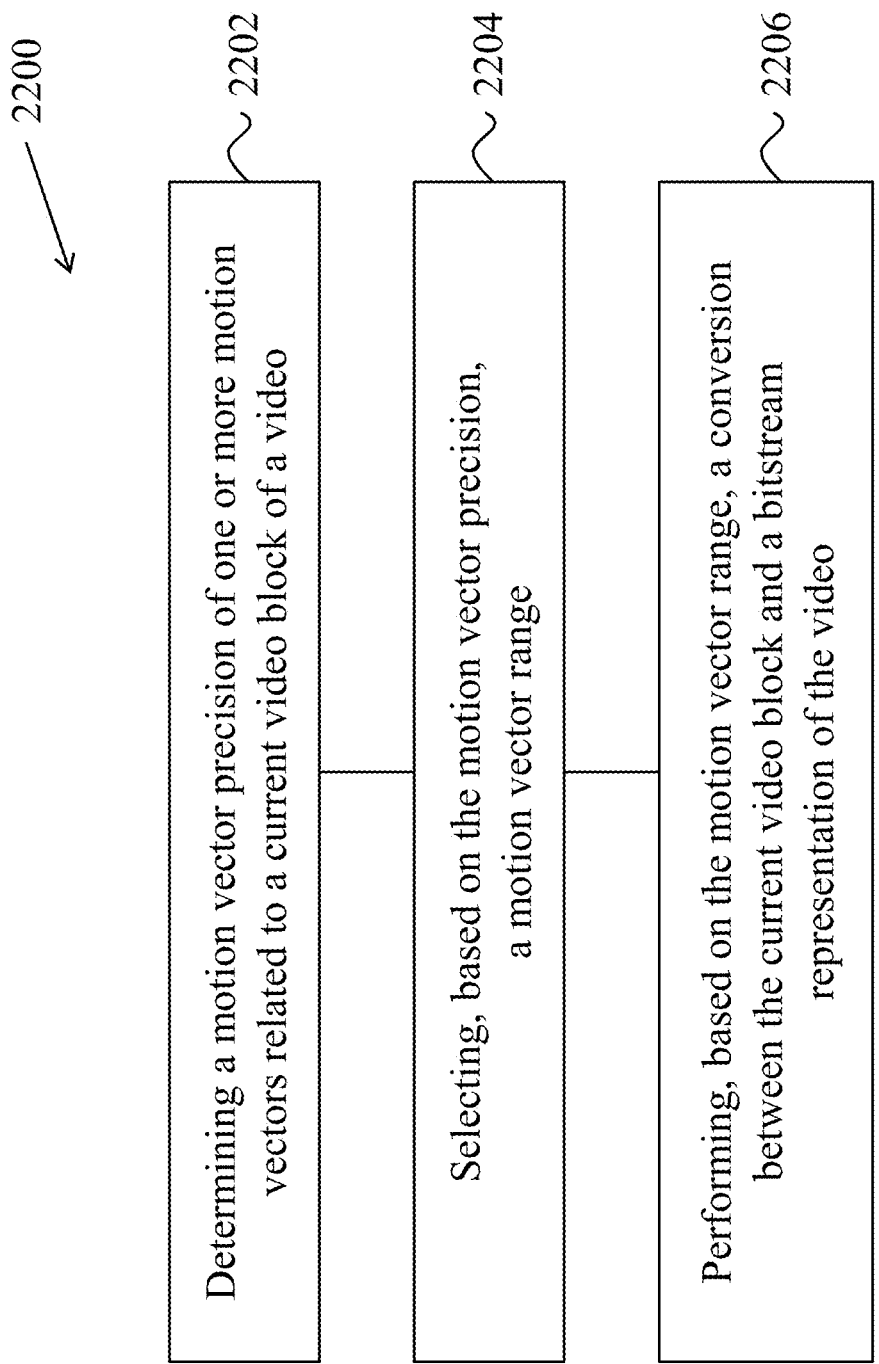
FIGS. 22A-22E show flowcharts of example methods for video processing based on some implementations of the disclosed technology.

FIG. 22A shows a flowchart of an exemplary method for video processing. The method 2200 includes, at step 2202, determining a motion vector precision of one or more motion vectors related to a current video block of a video. The method 2200 includes, at step 2204, selecting, based on the motion vector precision, a motion vector range. The method 2200 includes, at step 2206, performing, based on the motion vector range, a conversion between the current video block and a bitstream representation of the video.

Figure 22B:
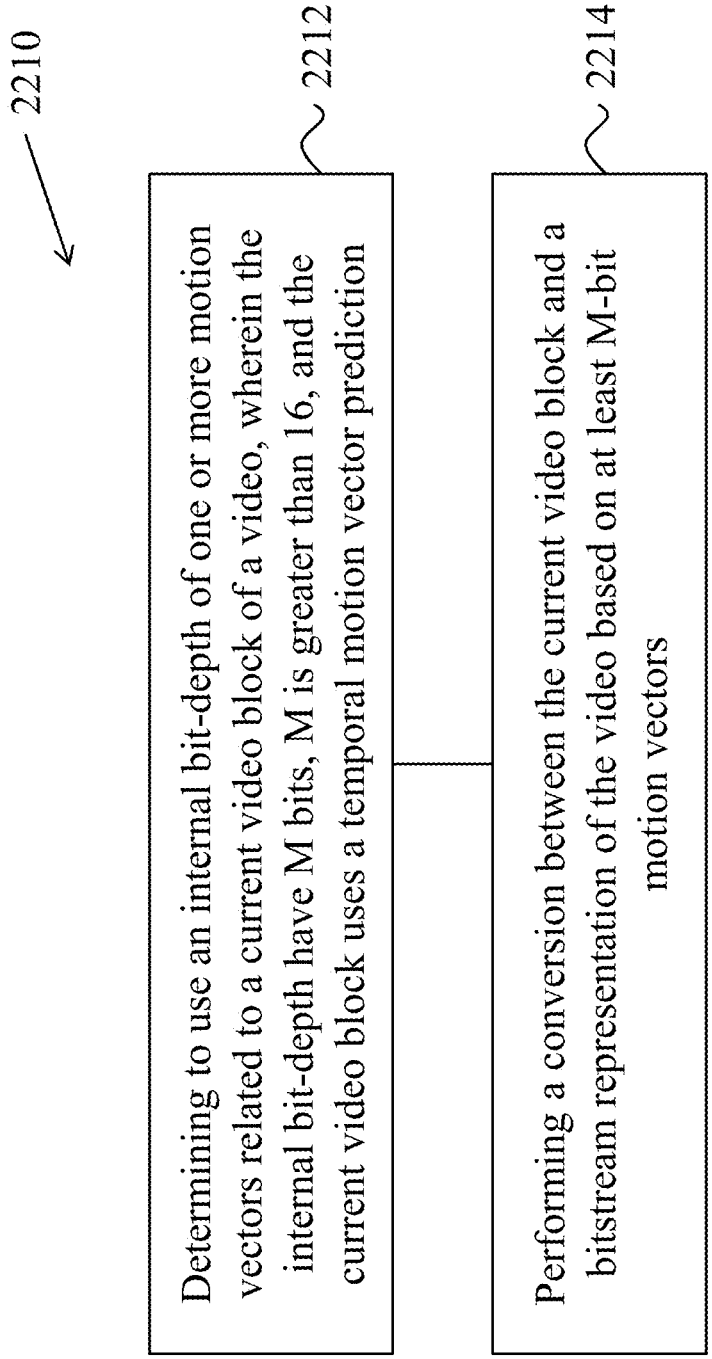

FIG. 22B shows a flowchart of an exemplary method for video processing. The method 2210 includes, at step 2212, determining to use an internal bit-depth of one or more motion vectors related to a current video block of a video, wherein the internal bit-depth have M bits, M is greater than 16, and the current video block uses a temporal motion vector prediction. The method 2210 further includes, at step 2214, performing a conversion between the current video block and a bitstream representation of the video based on at least M-bit motion vectors.

Figure 22C:
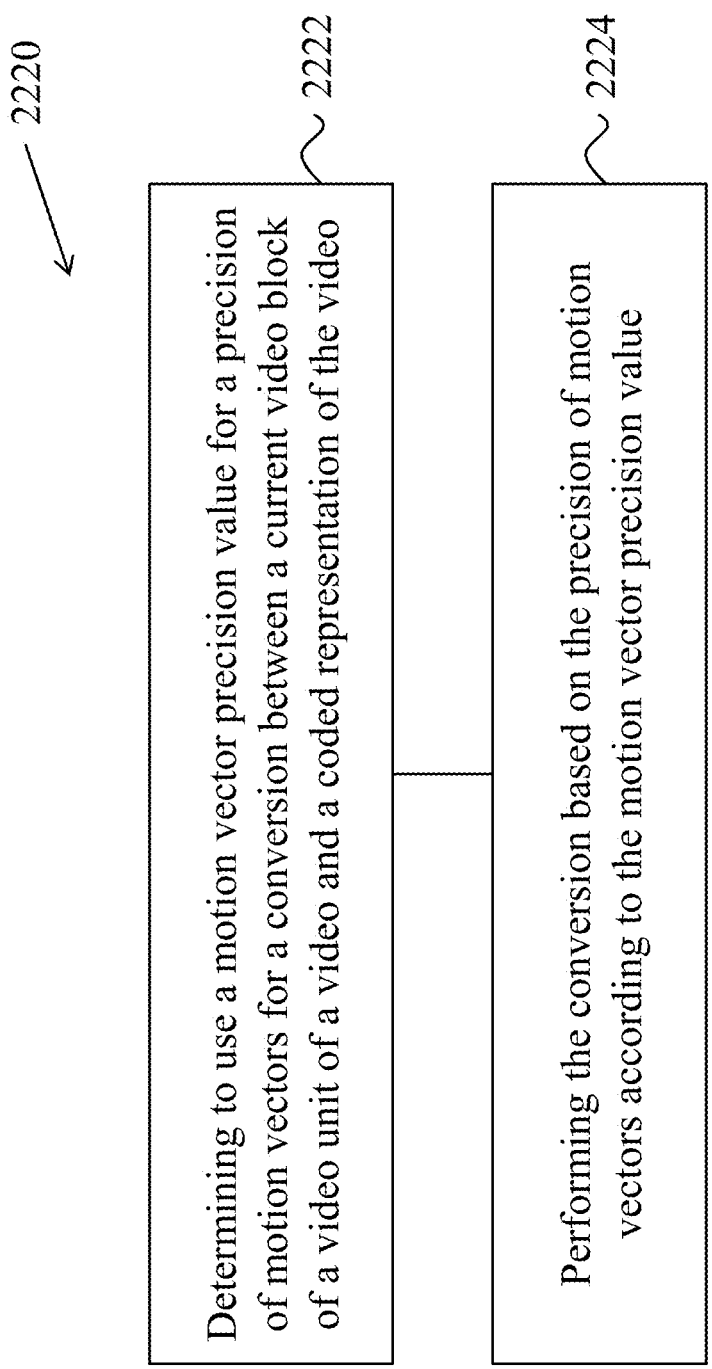

FIG. 22C shows a flowchart of an exemplary method for video processing. The method 2220 includes, at step 2222, determining to use a motion vector precision value for a precision of motion vectors for a conversion between a current video block of a video unit of a video and a coded representation of the video. The method 2220 further includes, at step 2224, performing the conversion based on the precision of motion vectors according to the motion vector precision value. In some implementations, a syntax element at the video unit level indicates the motion vector precision value.

Figure 22D:
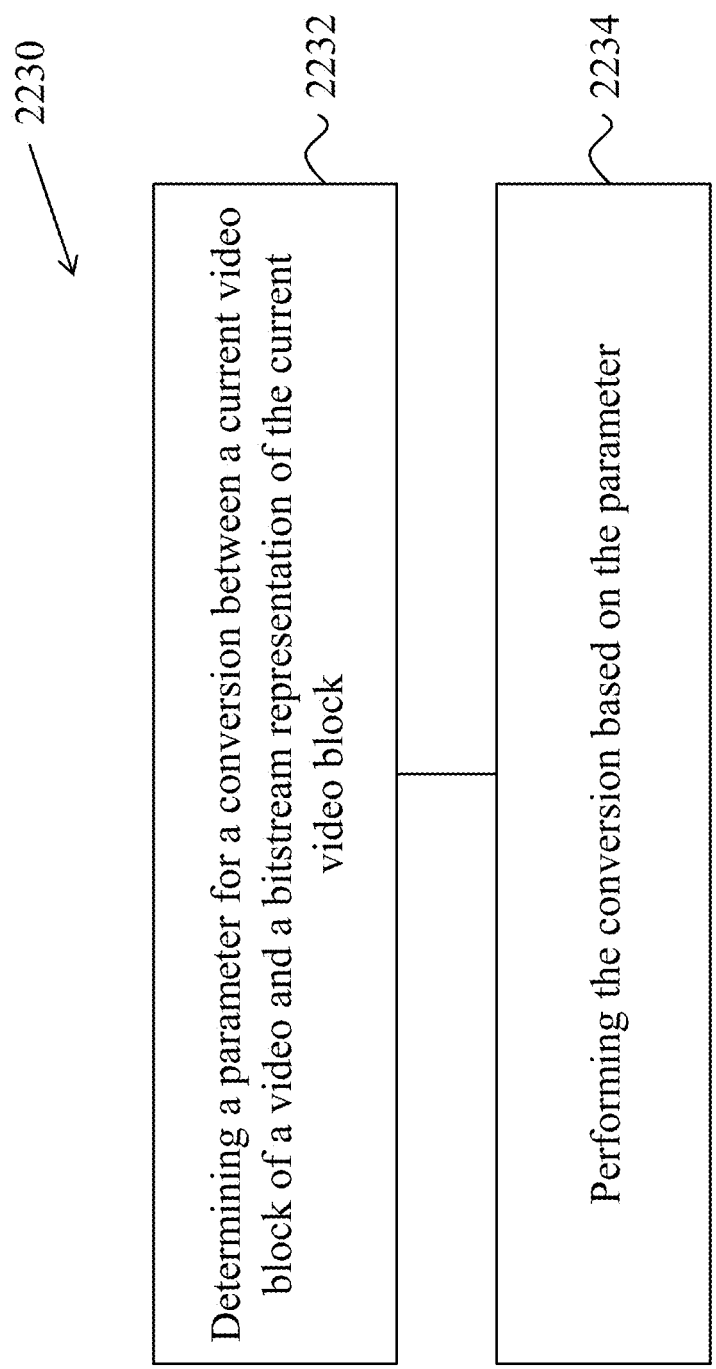

FIG. 22D shows a flowchart of an exemplary method for video processing. The method 2230 includes, at step 2232, determining a parameter for a conversion between a current video block of a video and a bitstream representation of the current video block. The method 2230 further includes, at step 2234, performing the conversion based on the parameter. In some implementations, the determining the parameter is based on a height or a width of a current picture that comprises the current video block.

Figure 22E:
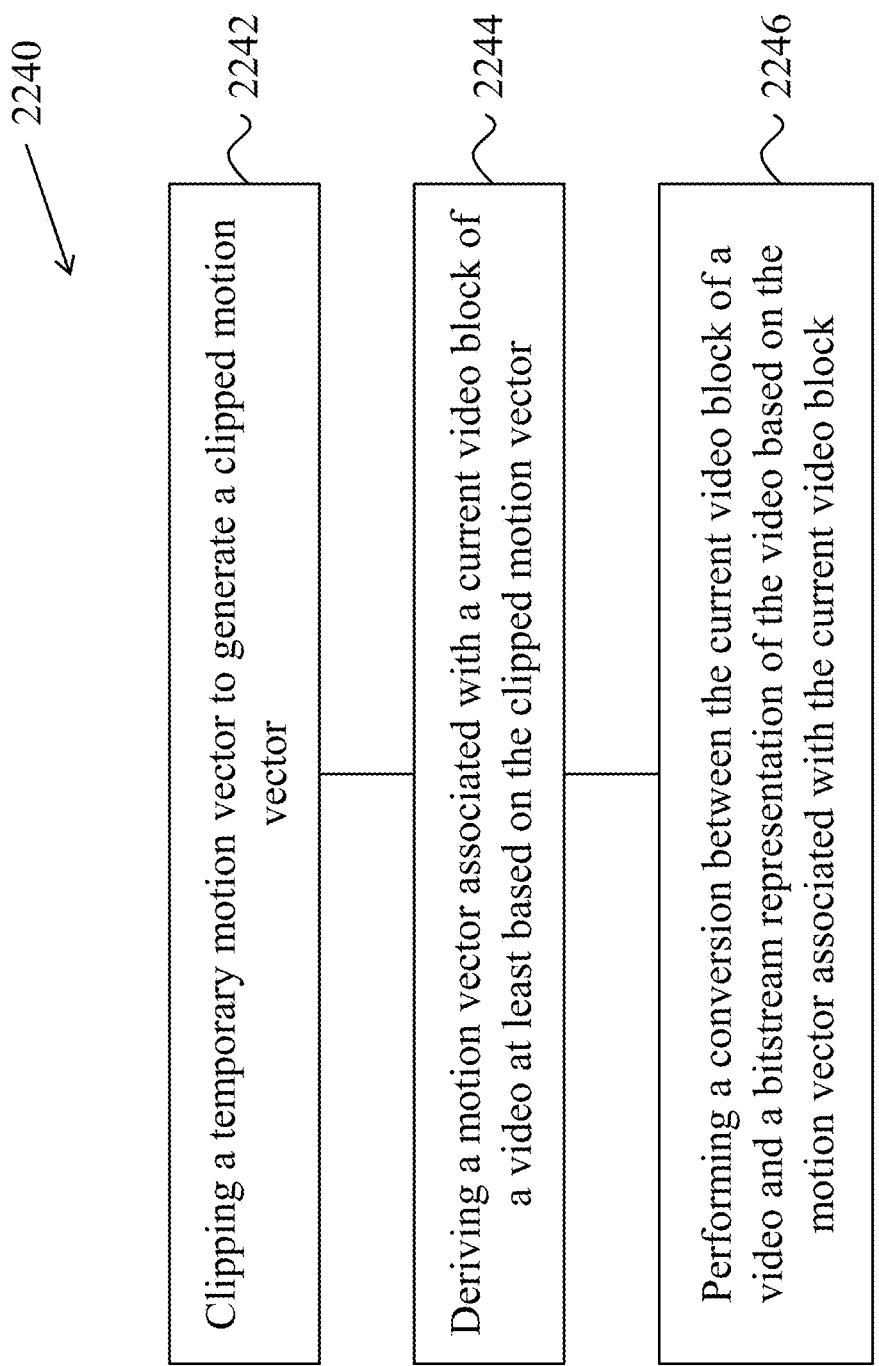

FIG. 22E shows a flowchart of an exemplary method for video processing. The method 2240 includes, at step 2242, clipping a temporary motion vector to generate a clipped motion vector. The method 2240 further includes, at step 2244, deriving a motion vector associated with a current video block of a video at least based on the clipped motion vector. The method 2240 further includes, at step 2246, performing a conversion between the current video block of a video and a bitstream representation of the video based on the motion vector associated with the current video block. In some implementations, the clipping of the temporary motion vector is based on at least one of a height (H) or a width (W) of a reference picture of the current video block, a top-left position (x0, y0) of the current video block, or a motion vector precision or an internal bit-depth (M) of the motion vector.

Figure 23A:
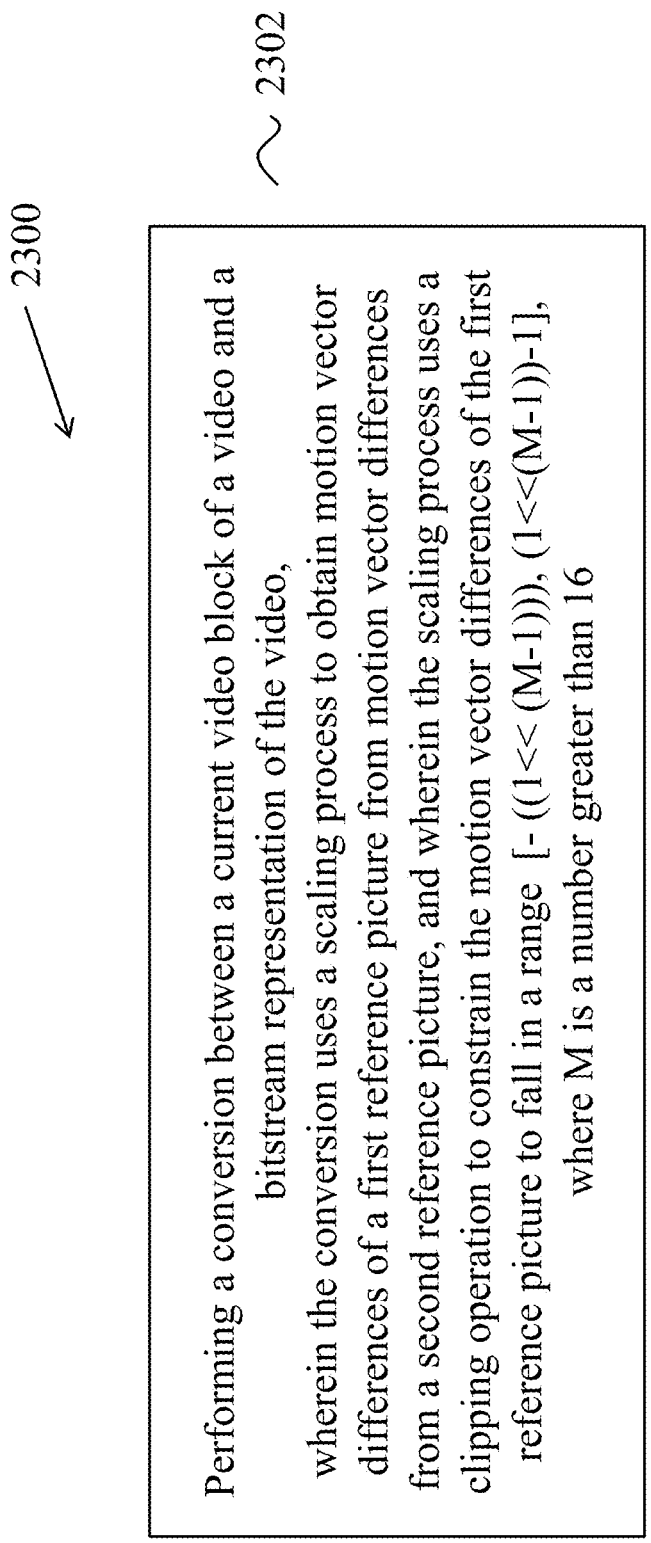
FIGS. 23A-23C show a flowcharts of examples methods for video processing based on some implementations of the disclosed technology.

FIG. 23A shows a flowchart of an exemplary method for video processing. The method 2300 includes, at step 2302, performing a conversion between a current video block of a video and a bitstream representation of the video, wherein the conversion uses a scaling process to obtain motion vector differences of a first reference picture from motion vector differences from a second reference picture, and wherein the scaling process uses a clipping operation to constrain the motion vector differences of the first reference picture to fall in a range [-((1<<(M-1))), (1<<(M-1))-1], where M is a number greater than 16.

Figure 23B:
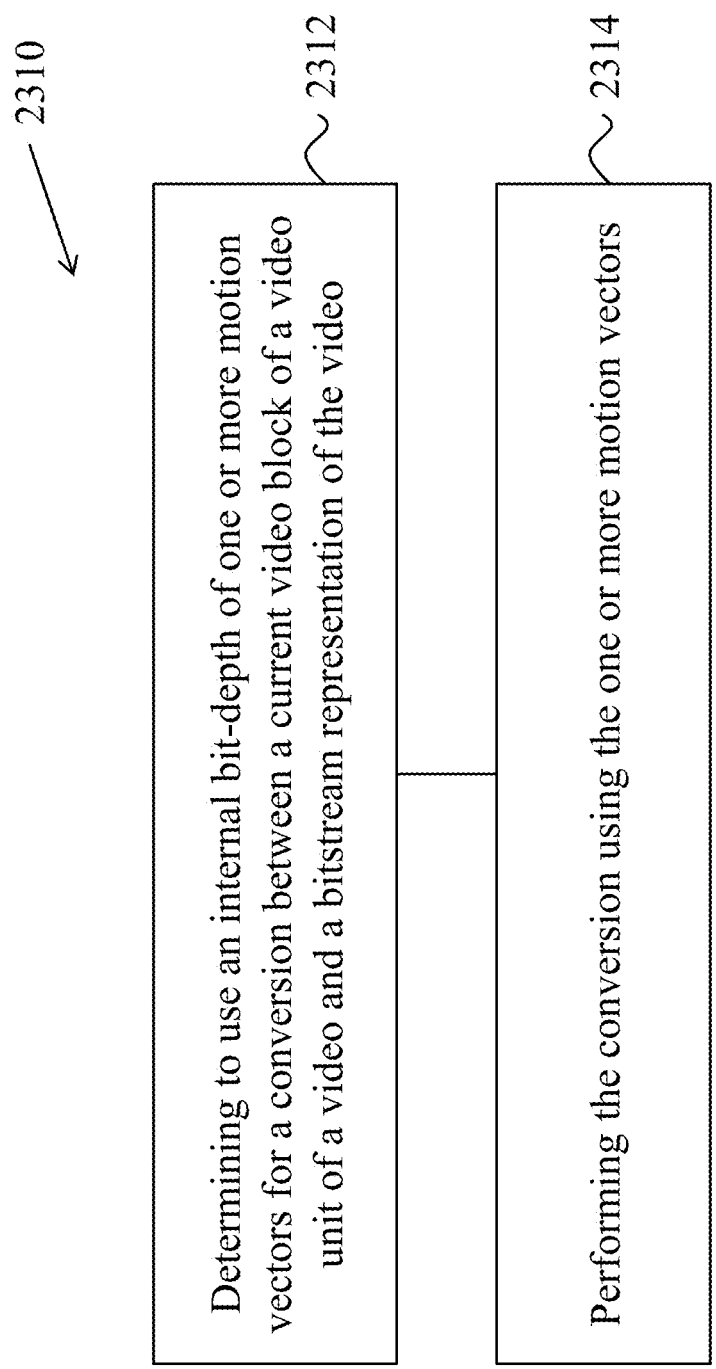

FIG. 23B shows a flowchart of an exemplary method for video processing. The method 2310 includes, at step 2312, determining to use an internal bit-depth of one or more motion vectors for a conversion between a current video block of a video unit of a video and a bitstream representation of the video. The method 2310 further includes, at step 2314, performing the conversion using the one or more motion vectors. In some implementations, a syntax element at a video unit level indicates the internal bit-depth.

Figure 23C:
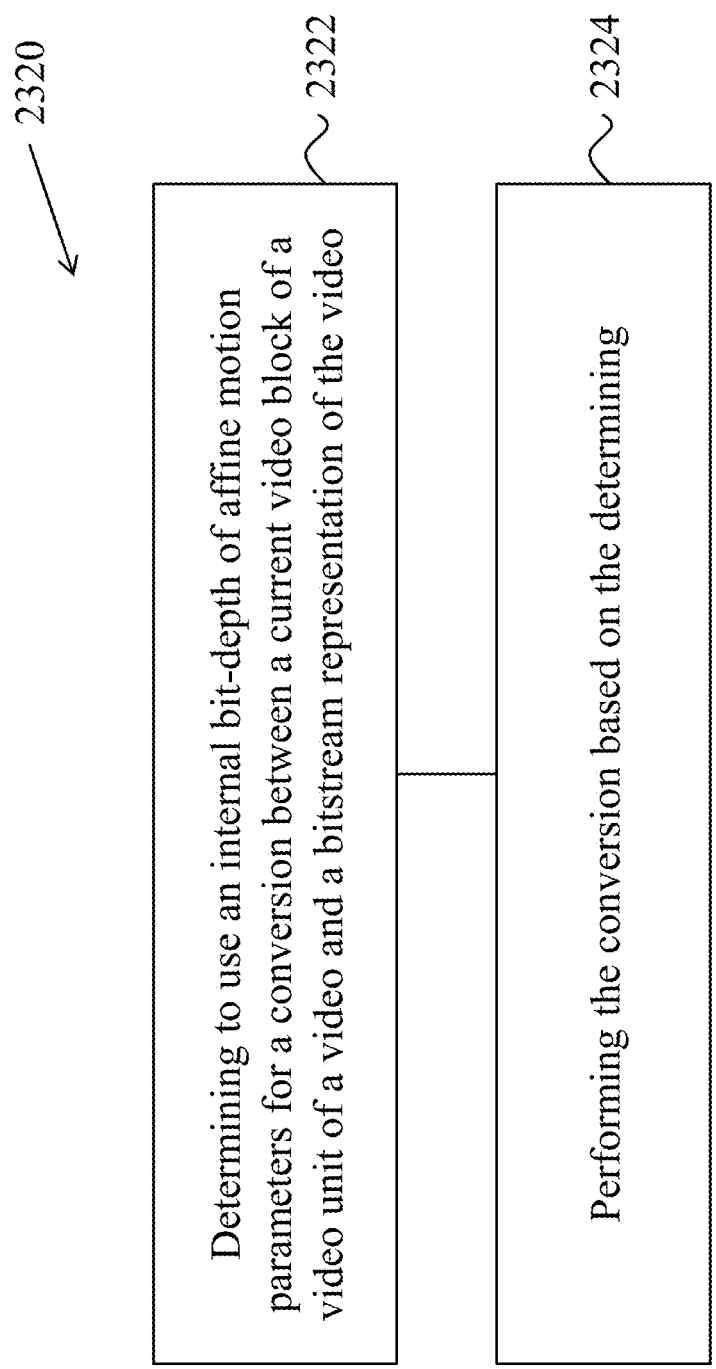

FIG. 23C shows a flowchart of an exemplary method for video processing. The method 2320 includes, at step 2322, determining to use an internal bit-depth of affine motion parameters for a conversion between a current video block of a video unit of a video and a bitstream representation of the video. The method 2320 further includes, at step 2324, performing the conversion based on the determining, wherein the internal bit-depth of the affine motion parameters has a same range for non-affine motion parameters.

5 Example Implementations of the Disclosed Technology

In some embodiments, the modifications in the JVET-L1001-v6 specification are as shown below, with both deletions and additions indicated using \begin{DELETE} and \end{ADD } tags, respectively.

8.3.3 Derivation Process for Subblock Motion Vector Components and Reference Indices 8.3.3.1 General
Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.
Outputs of this process are:
  the reference indices refIdxL0 and refIdxL1,
  the number of luma coding subblocks in horizontal direction numSbX and in vertical direction numSbY,
  the prediction list utilization flag arrays predFlagL0[xSbIdx][ySbIdx] and predFlagL1[xSbIdx][ySbIdx] with xSbIdx=0 . . . numSbX-1, ySbIdx=0 . . . numSbX-1,
  the luma subblock motion vector arrays in 1/16 fractional-sample accuracy mvL0[xSbIdx][ySbIdx] and mvL1[xSbIdx][ySbIdx] with xSbIdx=0 . . . numSbX-1, ySbIdx=0 . . . numSbY-1,
  the chroma subblock motion vector arrays in 1/32 fractional-sample accuracy myCL0[xSbIdx][ySbIdx] and myCL1[xSbIdx][ySbIdx] with xSbIdx=0 . . . numSbX-1, ySbIdx=0 . . . numSbY-1,
  the bi-prediction weight index gbiIdx.
For the derivation of the variables mvL0[xSbIdx][ySbIdx], mvL1[xSbIdx][ySbIdx], myCL0[xSbIdx][ySbIdx] and myCL1[xSbIdx][ySbIdx], refIdxL0, refIdxL1, numSbX, numSbY, predFlagL0[xSbIdx][ySbIdx] and predFlagL1[xSbIdx][ySbIdx ], the following applies:
  If merge_subblock_flag[xCb][yCb]is equal to 1, the derivation process for motion vectors and reference indices in subblock merge mode as specified in 8.3.3.2 is invoked with the luma coding block location (xCb, yCb), the luma coding block width cbWidth and the luma coding block height cbHeight as inputs, the number of luma coding subblocks in horizontal direction numSbX and in vertical direction numSbY, the reference indices refIdxL0, refIdxL1, the prediction list utilization flag arrays predFlagL0[xSbIdx][ySbIdx]and predFlagL1[xSbIdx][ySbIdx], the luma subblock motion vector arrays mvL0[xSbIdx][ySbIdx] and mvL0[xSbIdx][ySbIdx], and the chroma subblock motion vector arrays myCL0[xSbIdx][ySbIdx] and myCL1[xSbIdx][ySbIdx], with xSbIdx=0 . . . numSbX-1, ySbIdx=0 . . . numSbY-1, and the bi-prediction weight index gbiIdx as outputs.
  Otherwise (merge_subblock_flag[xCb][yCb] is equal to 0), for X being replaced by either 0 or 1 in the variables predFlagLX, cpMvLX, MvdCpLX, and refIdxLX, in PRED_LX, and in the syntax element ref_idx_1X, the following ordered steps apply:
    For the derivation of the number of control point motion vectors numCpMv, the control point motion vectors cpMvLX[cpIdx] with cpIdx ranging from 0 to numCpMv-1, refIdxLX, predFlagLX[0][0], the following applies:
      1. The number of control point motion vectors numCpMv is set equal to MotionModelIdc[xCb][yCb]+1.
      2. The variables refIdxLX and predFlagLX are derived as follows:
         If inter_pred_idc[xCb][yCb] is equal to PRED_LX or PRED_BI, refIdxLX=ref_idx_1X[xCb][yCb](8-347)
         predFlagLX[0][0]=1(8-348)
         Otherwise, the variables refIdxLX and predFlagLX are specified by: refIdxLX-1(8-349)
         predFlagLX[0][0]=0(8-350)
      3. The variable mvdCpLX[cpIdx] with cpIdx ranging from 0 to numCpMv-1, is derived as follows:
         mvdCpLX[cpIdx][0]=MvdCpLX[xCb][yCb][cpIdx][0](8-351)
         mvdCpLX[cpIdx][1]=MvdCpLX[xCb][yCb][cpIdx][1](8-352)
      4. When predFlagLX[0][0] is equal to 1, the derivation process for luma affine control point motion vector predictors as specified in clause 8.3.3.7 is invoked with the luma coding block location (xCb, yCb), and the variables cbWidth, cbHeight, refIdxLX, and the number of control point motion vectors numCpMv as inputs, and the output being mvpCpLX[cpIdx] with cpIdx ranging from 0 to numCpMv-1.
      5. When predFlagLX[0][0] is equal to 1, the luma motion vectors cpMvLX[cpIdx] with cpIdx ranging from 0 to NumCpMv-1, are derived as follows:

---

\begin {DELETE}
uLX[ cpIdx ][ 0 ] = ( mvpCpLX[ cpIdx ][ 0 ] + mvdCpLX[ cpIdx ][ 0 ] + $2^{18}$ ) % $2^{18}$ (8-353)
cpMvLX[ cpIdx ][ 0 ] = (uLX[ cpIdx ][ 0 ] >= $2^{17}$ ) ? (uLX[ cpIdx ][ 0 ] - $2^{18}$ ) :     (8-354)
uLX[ cpIdx ][ 0 ]
uLX[ cpIdx ][ 1 ] = ( mvpCpLX[ cpIdx ][ 1 ] + mvdCpLX[ cpIdx ][ 1 ] + $2^{18}$ ) % $2^{18}$ (8-355)

-continued

```
cpMvLX[ cpIdx ][ 1 ] = (uLX[ cpIdx ][ 1 ] >= 2^17 ) ? (uLX[ cpIdx ][ 1 ] - 2^18 ) :     (8-356)
uLX[ cpIdx ][ 1 ]
        \end(DELETE}
        \begin{ADD}
cpMvLX[ cpIdx ][ 0 ] = Clip3( -2^{M-1}, 2^{M-1} - 1,
(mvpCpLX[ cpIdx ][ 0 ] + mvdCpLX[ cpIdx ][ 0 ]))
cpMvLX[ cpIdx ][ 1 ] = Clip3( -2^{M-1}, 2^{M-1} - 1,
(mvpCpLX[ cpIdx ][ 1 ] + mvdCpLX[ cpIdx ][ 1 ]))
        \end{ADD}
 - The variables num SbX and num SbY are derived as follows:
        num SbX = ( cbWidth >> 2 )                                                        (8-357)
        num SbY = ( cbHeight >> 2 )                                                       (8-358)
 - For xSbIdx = 0..numSbX - 1, ySbIdx = 0..numSbY - 1, the following applies:
        predFlagLX[ xSbIdx ][ ySbIdx ] = predFlagLX[ 0 ][ 0 ]                             (8-359)
```

When predFlagLX[0][0] is equal to 1, the derivation process for motion vector arrays from affine control point motion vectors as specified in subclause 8.3.3.9 is invoked with the luma coding block location (xCb, yCb), the luma coding block width cbWidth, the luma prediction block height cbHeight, the number of control point motion vectors numCpMv, the control point motion vectors cpMvLX[cpIdx] with cpIdx being 0 . . . 2, and the number of luma coding subblocks in horizontal direction numSbX and in vertical direction numSbY as inputs, the luma motion vector array mvLX [xSbIdx][ySbIdx] and the chroma motion vector array myCLX[xSbIdx][ySbIdx] with xSbIdx=0 . . . numSbX-1, ySbIdx=0 . . . numSbY-1 as outputs.

The bi-prediction weight index gbiIdx is set equal to gbi_idx[xCb][yCb].

Figure 24A:
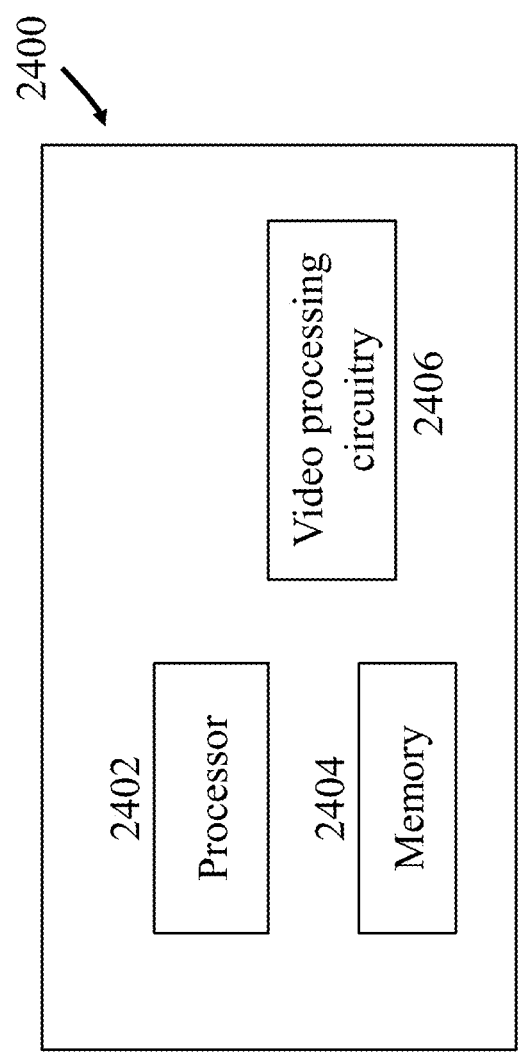
FIGS. 24A and 24B show examples of hardware platforms for implementing a visual media decoding or a visual media encoding technique described in the present document.

FIG. 24A is a block diagram of a video processing apparatus 2400. The apparatus 2400 may be used to implement one or more of the methods described herein. The apparatus 2400 may be embodied in a smartphone, tablet, computer, Internet of Things (IoT) receiver, and so on. The apparatus 2400 may include one or more processors 2402, one or more memories 2404 and video processing hardware 2406. The processor(s) 2402 may be configured to implement one or more methods as shown in FIGS. 21 to 23C described in the present document. The memory (memories) 2404 may be used for storing data and code used for implementing the methods and techniques described herein. The video processing hardware 2406 may be used to implement, in hardware circuitry, some techniques described in the present document.

Figure 24B:
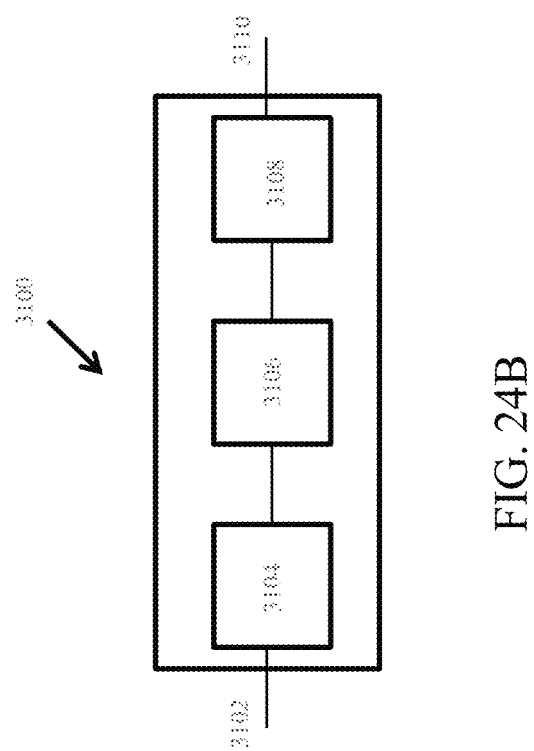

FIG. 24B is another example of a block diagram of a video processing system in which disclosed techniques may be implemented. FIG. 24B is a block diagram showing an example video processing system 3100 in which various techniques disclosed herein may be implemented. Various implementations may include some or all of the components of the system 3100. The system 3100 may include input 3102 for receiving video content. The video content may be received in a raw or uncompressed format, e.g., 8 or 10 bit multi-component pixel values, or may be in a compressed or encoded format. The input 3102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3100 may include a coding component 3104 that may implement the various coding or encoding methods described in the present document. The coding component 3104 may reduce the average bitrate of video from the input 3102 to the output of the coding component 3104 to produce a coded representation of the video. The coding techniques are therefore sometimes called video compression or video transcoding techniques. The output of the coding component 3104 may be either stored, or transmitted via a communication connected, as represented by the component 3106. The stored or communicated bitstream (or coded) representation of the video received at the input 3102 may be used by the component 3108 for generating pixel values or displayable video that is sent to a display interface 3110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE), and the like. The techniques described in the present document may be embodied in various electronic devices such as mobile phones, laptops, smartphones or other devices that are capable of performing digital data processing and/or video display.

In some embodiments, the video coding methods may be implemented using an apparatus that is implemented on a hardware platform as described with respect to FIG. 24A or 24B.

Various techniques and embodiments may be described using the following clause-based format.

The first set of clauses describe certain features and aspects of the disclosed techniques listed in the previous section, including, for example, Examples 1 and 3(a).

1. A method for video processing, comprising: deriving, based on unclipped previously calculated luma motion vectors of multiple luma blocks, a chroma motion vector for a chroma block associated with a current video block of a video; and performing, based on the chroma motion vector, a conversion between the current video block and a bitstream representation of the video.

2. The method of clause 1, wherein the method for deriving the chroma motion vector is further based on a color format of the current video block.

3. The method of clause 2, wherein the color format of the current video block is 4:2:0, 4:2:2 or 4:4:4.

4. The method of clause 1, wherein the deriving the chroma motion vector is based on four luma motion vectors of the unclipped previously calculated luma motion vectors.
5. The method of clause 4, wherein the color format is 4:2:0.
6. The method of clause 1, wherein the deriving the chroma motion vector is based on two luma motion vectors of the unclipped previously calculated luma motion vectors.
7. The method of clause 6, wherein the color format is 4:2:2.
8. The method of clause 1, wherein the deriving the chroma motion vector is based on one luma motion vector of the unclipped previously calculated luma motion vectors.
9. The method of clause 8, wherein the color format is 4:4:4.
10. The method of clause 1, wherein the deriving the chroma motion vector is based on a linear function of the plurality of luma motion vectors.
11. The method of clause 1, further comprising: clipping the chroma motion vector to generate a clipped chroma motion vector, wherein the performing the conversion comprises motion compensation based on the clipped chroma motion vector.
12. The method of any of clauses 1 to 11, wherein the current video block comprises sub-blocks, and wherein the performing the conversion is based on at least one of affine prediction, sub-block temporal motion vector prediction (SbTMVP), or spatial-temporal motion vector prediction (STMVP).
13. The method of clause 12, wherein the performing the conversion is based on the affine prediction and the chroma motion vector is set as an average of motion vectors of four corresponding luma blocks.
14. The method of any of clauses 1 to 11, wherein the chroma block and the multiple luma blocks correspond to a Y/Cb/Cr color space.
15. The method of any of clauses 1 to 11, wherein the chroma block and the plurality of luma blocks correspond to an R/G/B color space.
16. A method for video processing, comprising: determining to use an internal bit-depth of one or more motion vectors related to a current video block of a video, the internal bit-depth being M bits, wherein M is greater than 16; and performing a conversion between the current video block and a bitstream representation of the video based on an advanced motion vector prediction (AMVP) process and the M-bit motion vectors.
17. The method of clause 16, wherein at least one of the one or more motion vectors is derived from a motion vector predictor, and wherein the motion vector predictor is scaled to a range $[-((1<<(M-1))), (1<<(M-1))-1]$.
18. The method of clause 17, wherein M is 18 and the range is $[-131072, 131071]$.
19. The method of clause 17, wherein the motion vector predictor is associated with a block which has a reference picture that is different from a target reference picture of the current video block.
20. The method of any of clauses 1 to 19, wherein the conversion comprises generating pixel values of the current video block from the bitstream representation.
21. The method of any of clauses 1 to 19, wherein the conversion comprises generating the bitstream representation from pixel values of the current video block.
22. An apparatus in a video system comprising a processor and a non-transitory memory with instructions thereon, wherein the instructions upon execution by the processor, cause the processor to implement the method in any one of clauses 1 to 21.
23. A computer program product stored on a non-transitory computer readable media, the computer program product including program code for carrying out the method in any one of clauses 1 to 21.

The second set of clauses describe certain features and aspects of the disclosed techniques listed in the previous section, including, for example, Examples 2, 3(b), 4, 6, and 8.

1. A method for video processing, comprising: determining a motion vector precision of one or more motion vectors related to a current video block of a video; selecting, based on the motion vector precision, a motion vector range; and performing, based on the motion vector range, a conversion between the current video block and a bitstream representation of the video.
2. The method of clause 1, wherein the performing the conversion uses an adaptive motion vector difference resolution (AMVR) coding tool.
3. The method of clause 1, wherein the selecting the motion vector range is further based on a profile or a level of the AMVR coding tool.
4. The method of clause 1, wherein the selecting the motion vector range is further based on a coding mode of the current video block.
5. The method of clause 1, further comprising: clipping, based on the motion vector range, the one or more motion vectors prior to the performing the conversion.
6. The method of clause 5, wherein the clipping the one or more motion vectors is performed with input parameters that are determined based on the motion vector range.
7. A method for video processing, comprising: determining to use an internal bit-depth of one or more motion vectors related to a current video block of a video, wherein the internal bit-depth have M bits, M is greater than 16, and the current video block uses a temporal motion vector prediction; and performing a conversion between the current video block and a bitstream representation of the video based on at least M-bit motion vectors.
8. The method of clause 7, wherein the conversion is performed based on the temporal motion vector prediction for an advanced motion vector prediction (AMVP) mode of the current video block.
9. The method of clause 7, wherein the conversion is performed based on the temporal motion vector prediction for a merge mode of the current video block.
10. The method of clause 7, wherein the conversion is performed based on the temporal motion vector prediction for an alternative temporal motion vector prediction (ATMVP) mode of the current video block, wherein the ATMVP mode allows at least one set of motion information to be derived from blocks smaller than a current coding unit.
11. The method of clause 7, wherein the conversion is performed based on the temporal motion vector prediction for a spatial-temporal motion vector prediction (STMVP) mode of the current video block.
12. The method of clause 7, wherein the one or more motion vectors are derived from a motion vector prediction candidate, the motion vector prediction candidate is derived at least based on a motion vector associated with a temporal reference picture, the motion vector is scaled to a target reference picture, and the scaled motion vector is clipped to be within the range of [-((1<<(M-1))), (1<<(M-1))-1].
13. The method of clause 12, wherein M is 18 and the range is [-131072, 131071].
14. A method of video processing, comprising: determining to use a motion vector precision value for a precision of motion vectors for a conversion between a current video block of a video unit of a video and a coded representation of the video; and performing the conversion based on the precision of motion vectors according to the motion vector precision value, wherein a syntax element at the video unit level indicates the motion vector precision value.
15. The method of clause 14, wherein the video unit corresponds to a video sequence a video picture, a slice, a tile, a coding tree unit row or a coding tree unit.
16. The method of clause 14, wherein the syntax element is in a video parameter set, a picture parameter set, a slice header, a tile group header, a tile header, a coding tree unit header or a coding tree unit header.
17. The method of any one of clauses 14-16, wherein the determining to use the motion vector precision value is based on a profile or a level or a tier used for the conversion.
18. A method for video processing, comprising: determining a parameter for a conversion between a current video block of a video and a bitstream representation of the current video block; and performing the conversion based on the parameter, wherein the determining the parameter is based on a height or a width of a current picture that comprises the current video block.
19. The method of clause 18, wherein the parameter is a motion vector precision of one or more motion vectors used during the conversion.
20. The method of clause 18, wherein the parameter is an internal bit-depth of one or more motion vectors used during the conversion.
21. A method for video processing, comprising: clipping a temporary motion vector to generate a clipped motion vector; deriving a motion vector associated with a current video block of a video at least based on the clipped motion vector; and performing a conversion between the current video block of a video and a bitstream representation of the video based on the motion vector associated with the current video block, wherein the clipping of the temporary motion vector is based on at least one of a height (H) or a width (W) of a reference picture of the current video block, a top-left position (x0, y0) of the current video block, or a motion vector precision or an internal bit-depth (M) of the motion vector.
22. The method of clause 21, wherein the motion vector precision is 1/(1<<Shift) sub-pixels, wherein Shift is a positive integer, wherein CW and CH are a maximum width and a maximum height, respectively, of a coding unit of the current video block, wherein an x-component of the motion vecto is clipped to a range [MVMinH, MVMaxH], wherein a y component of the one or more motion vectors is clipped to a range [MVMinV, MVMaxV], wherein MVMinH=max(PicMinH, -(1<<(M-1))), MVMinV=max(PicMinV, -(1<<(M-1))), MVMaxH=min(PicMaxH, (1<<(M-1))-1), and MVMaxV=min(PicMaxV, (1<<(M-1))-1), wherein PicMinH=(-x0+1+Offset1)<<Shift, PicMaxH=(W-1-x0+Offset2)<<Shift, PicMinV=(-y0+1+Offset3)<<Shift, and PicMaxV=(H-1-y0+Offset4)<<Shift, and wherein Offset1, Offset2, Offset3 and Offset4 are non-negative integers based on one or more padding methods.
23. The method of clause 22, wherein Offset1=-CW-8, Offset3=-CH-8, Offset2=8 and Offset4=8.
24. The method of any of clauses 1 to 23, wherein the conversion comprises generating pixel values of the current video block from the bitstream representation.
25. The method of any of clauses 1 to 23, wherein the conversion comprises generating the bitstream representation from pixel values of the current video block.
26. An apparatus in a video system comprising a processor and a non-transitory memory with instructions thereon, wherein the instructions upon execution by the processor, cause the processor to implement the method in any one of clauses 1 to 25.
27. A computer program product stored on a non-transitory computer readable media, the computer program product including program code for carrying out the method in any one of clauses 1 to 25.

The third set of clauses describe certain features and aspects of the disclosed techniques listed in the previous section, including, for example, Examples 3(c)-(d), 5, 7, and 9.

1. A method for video processing, comprising: performing a conversion between a current video block of a video and a bitstream representation of the video, wherein the conversion uses a scaling process to obtain motion vector differences of a first reference picture from motion vector differences from a second reference picture, and wherein the scaling process uses a clipping operation to constrain the motion vector differences of the first reference picture to fall in a range [-((1<<(M-1))), (1<<(M-1))-1], where M is a number greater than 16.
2. The method of clause 1, wherein the first reference picture is associated with a first reference picture list.
3. The method of clause 1, wherein the first reference picture is associated with a second reference picture list.
4. The method of clause 3, wherein the first reference picture list is different from the second reference picture list.
5. The method of clause 1, wherein an affine coding tool is enabled for the conversion.
6. The method of clause 5, wherein a field in the bitstream representation indicates that the affine coding tool is enabled.
7. The method of clause 1, wherein the conversion is performed based on a motion vector difference (MVD) derivation process for a merge with motion vector difference (MMVD) mode and wherein the MMVD mode comprises a motion vector expression that includes a starting point, a motion vector distance and a motion direction for the current video block.
8. The method of clause 7, wherein at least one of the motion vector differences of the first reference picture or the second reference picture is derived based on at least one of the motion vector distance or the motion direction for the current video block.
9. The method of clause 8, wherein at least one merge candidate is selected based on the motion vector expression and further refined by the at least one of the motion vector differences.
10. The method of clause 1, wherein an internal bit-depth of the one or more motion vectors is signaled in a video parameter set (VPS), a picture parameter set (PPS), a slice header, a tile, a tile group, a coding tree unit (CTU) or a CTU row.

11. A method for video processing, comprising: determining to use an internal bit-depth of one or more motion vectors for a conversion between a current video block of a video unit of a video and a bitstream representation of the video; and performing the conversion using the one or more motion vectors, wherein a syntax element at a video unit level indicates the internal bit-depth.

12. The method of clause 11, wherein the video unit corresponds to a video sequence, a video picture, a slice, a tile, a coding tree unit row or a coding tree unit.

13. The method of clause 12, further comprising: correspondingly the syntax element is in a video parameter set, a picture parameter set, a slice header, a tile group header, a tile header, a coding tree unit header or a coding tree unit header.

14. The method of clause 11 or 12, wherein the determining to use the internal bit-depth is based on a profile or a level or a tier used for the conversion.

15. The method of clause 11 or 12, wherein the internal bit-depth is based on a height or a width of a current picture that comprises the current video block.

16. A method for video processing, comprising: determining to use an internal bit-depth of affine motion parameters for a conversion between a current video block of a video unit of a video and a bitstream representation of the video; and performing the conversion based on the determining, wherein the internal bit-depth of the affine motion parameters has a same range for non-affine motion parameters.

17. The method of clause 16, wherein the range is $[-2^{15}, 2^{15}-1]$.

18. The method of clause 16, wherein the range is $[-2^{17}, 2^{17}-1]$.

19. The method of clause 16, wherein the affine motion parameters include at least one of affine motion vectors, affine motion vector predictors, or control point motion vectors (CPMVs).

20. The method of any of clauses 1 to 19, wherein the conversion comprises generating pixel values of the current video block from the bitstream representation.

21. The method of any of clauses 1 to 19, wherein the conversion comprises generating the bitstream representation from pixel values of the current video block.

22. An apparatus in a video system comprising a processor and a non-transitory memory with instructions thereon, wherein the instructions upon execution by the processor, cause the processor to implement the method in any one of clauses 1 to 21.

23. A computer program product stored on a non-transitory computer readable media, the computer program product including program code for carrying out the method in any one of clauses 1 to 21.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices.

The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for processing video data, comprising:
   deriving, for a conversion between a current video block of a video and a bitstream of the video, at least one temporal collocated motion vector, wherein each of the at least one temporal collocated motion vector is derived at least based on a motion vector associated with a first block which has a temporal reference picture that is different from a target reference picture of the current video block;
   scaling each of the at least one temporal collocated motion vector based on a first picture order count difference between the target reference picture and a current picture including the current video block and a second picture order count difference between the temporal reference picture and a first picture including the first block;
   performing a first clipping operation on the at least one scaled temporal collocated motion vector to derive at least one clipped temporal collocated motion vector, wherein a clipping range of each component of the at least one clipped temporal collocated motion vector is $[-(1<<(M-1)), (1<<(M-1))-1]$, where M is greater than 16 and $<<$ is an arithmetic left shift operation; and
   performing the conversion based on the at least one clipped temporal collocated motion vector;
   wherein the at least one clipped temporal collocated motion vector includes a first temporal collocated motion vector which is used to construct a subblock motion candidate list, and wherein the first temporal collocated motion vector is derived based on a temporal motion shift from a spatial neighboring block of the current video block, and a reference picture related to the temporal motion shift is a same as a collocated picture of the current video block.

2. The method of claim 1, wherein the at least one clipped temporal collocated motion vector is further used to construct a motion candidate list, and at least one motion predictor derived based on the motion candidate list is used in the conversion directly, or is combined with at least one motion vector difference to derive a refined motion vector.

3. The method of claim 2, wherein each component of the refined motion vector has a bit-depth M-bit.

4. The method of claim 2, wherein when the at least one motion vector difference comprising two motion vector differences and a third picture order count difference between a first reference picture and the current picture is less than a forth picture order count difference between a second reference picture and the current picture, the conversion uses a scaling process to obtain motion vector difference of the first reference picture from the motion vector difference of the second reference picture which is indicated by a filed in the bitstream, and wherein the scaling process uses a second clipping operation to constrain each component of the motion vector difference of the first reference picture to fall in a range $[-((1<<(M-1))), (1<<(M-1))-1]$.

5. The method of claim 1, wherein M is 18 and the range is $[-131072, 131071]$.

6. The method of claim 1, wherein the conversion is performed based on the at least one clipped temporal collocated motion vector for a spatial-temporal motion vector prediction mode of the current video block.

7. The method of claim 1, wherein the conversion comprises decoding the current video block from the bitstream.

8. The method of claim 1, wherein the conversion comprises encoding the current video block into the bitstream.

9. An apparatus for processing video data comprising a processor and a non-transitory memory with instructions thereon, wherein the instructions upon execution by the processor, cause the processor to:
   derive, for a conversion between a current video block of a video and a bitstream of the video, at least one temporal collocated motion vector, wherein each of the at least one temporal collocated motion vector is derived at least based on a motion vector associated with a first block which has a temporal reference picture that is different from a target reference picture of the current video block;
   scale each of the at least one temporal collocated motion vector based on a first picture order count difference between the target reference picture and a current picture including the current video block and a second picture order count difference between the temporal reference picture and a first picture including the first block;
   perform a first clipping operation on the at least one scaled temporal collocated motion vector to derive at least one clipped temporal collocated motion vector, wherein a clipping range of each component of the at least one clipped temporal collocated motion vector is $[-(1<<(M-1)), (1<<(M-1))-1]$, where M is greater than 16 and $<<$ is an arithmetic left shift operation; and
   perform the conversion based on the at least one clipped temporal collocated motion vector;
   wherein the at least one clipped temporal collocated motion vector includes a first temporal collocated motion vector which is used to construct a subblock motion candidate list, and wherein the first temporal collocated motion vector is derived based on a temporal motion shift from a spatial neighboring block of the current video block, and a reference picture related to the temporal motion shift is a same as a collocated picture of the current video block.

10. The apparatus of claim 9, wherein the at least one clipped temporal collocated motion vector is further used to construct a motion candidate list, and at least one motion predictor derived based on the motion candidate list is used in the conversion directly, or is combined with at least one motion vector difference to derive a refined motion vector.

11. The apparatus of claim 10, wherein each component of the refined motion vector has a bit-depth M-bit.

12. The apparatus of claim 10, wherein when the at least one motion vector difference comprising two motion vector differences and a third picture order count difference between a first reference picture and the current picture is less than a forth picture order count difference between a second reference picture and the current picture, the conversion uses a scaling process to obtain motion vector difference of the first reference picture from the motion vector difference of the second reference picture which is indicated by a filed in the bitstream, and wherein the scaling process uses a second clipping operation to constrain each component of the motion vector difference of the first reference picture to fall in a range [−((1<<(M−1))), (1<<(M−1))−1].

13. The apparatus of claim 9, wherein M is 18 and the range is [−131072, 131071].

14. A non-transitory computer-readable storage medium storing instructions that cause a processor to:
derive, for a conversion between a current video block of a video and a bitstream of the video, at least one temporal collocated motion vector, wherein each of the at least one temporal collocated motion vector is derived at least based on a motion vector associated with a first block which has a temporal reference picture that is different from a target reference picture of the current video block;
scale each of the at least one temporal collocated motion vector based on a first picture order count difference between the target reference picture and a current picture including the current video block and a second picture order count difference between the temporal reference picture and a first picture including the first block;
perform a first clipping operation on the at least one scaled temporal collocated motion vector to derive at least one clipped temporal collocated motion vector, wherein a clipping range of each component of the at least one clipped temporal collocated motion vector is [−(1<<(M−1)), (1<<(M−1))−1], where M is greater than 16 and << is an arithmetic left shift operation; and
perform the conversion based on the at least one clipped temporal collocated motion vector;
wherein the at least one clipped temporal collocated motion vector includes a first temporal collocated motion vector which is used to construct a subblock motion candidate list, and wherein the first temporal collocated motion vector is derived based on a temporal motion shift from a spatial neighboring block of the current video block, and a reference picture related to the temporal motion shift is a same as a collocated picture of the current video block.

15. The non-transitory computer-readable storage medium of claim 14, wherein the at least one clipped temporal collocated motion vector is further used to construct a motion candidate list, and at least one motion predictor derived based on the motion candidate list is used in the conversion directly, or is combined with at least one motion vector difference to derive a refined motion vector.

16. The non-transitory computer-readable storage medium of claim 15, wherein when the at least one motion vector difference comprising two motion vector differences and a third picture order count difference between a first reference picture and the current picture is less than a forth picture order count difference between a second reference picture and the current picture, the conversion uses a scaling process to obtain motion vector difference of the first reference picture from the motion vector difference of the second reference picture which is indicated by a filed in the bitstream, and wherein the scaling process uses a second clipping operation to constrain each component of the motion vector difference of the first reference picture to fall in a range [−((1<<(M−1))), (1<<(M−1))−1].

17. A method for storing a bitstream of a video, comprising:
deriving at least one temporal collocated motion vector, wherein each of the at least one temporal collocated motion vector is derived at least based on a motion vector associated with a first block which has a temporal reference picture that is different from a target reference picture of a current video block;
scaling each of the at least one temporal collocated motion vector based on a first picture order count difference between the target reference picture and a current picture including the current video block and a second picture order count difference between the temporal reference picture and a first picture including the first block;
performing a first clipping operation on the at least one scaled temporal collocated motion vector to derive at least one clipped temporal collocated motion vector, wherein a clipping range of each component of the at least one clipped temporal collocated motion vector is [−(1<<(M−1)), (1<<(M−1))−1], where M is greater than 16 and << is an arithmetic left shift operation;
generating the bitstream based on the at least one clipped temporal collocated motion vector; and
storing the bitstream in a non-transitory computer-readable recording medium;
wherein the at least one clipped temporal collocated motion vector includes a first temporal collocated motion vector which is used to construct a subblock motion candidate list, and wherein the first temporal collocated motion vector is derived based on a temporal motion shift from a spatial neighboring block of the current video block, and a reference picture related to the temporal motion shift is a same as a collocated picture of the current video block.

18. The method of claim 17, wherein the at least one clipped temporal collocated motion vector is further used to construct a motion candidate list, and at least one motion predictor derived based on the motion candidate list is used in the generating directly, or is combined with at least one motion vector difference to derive a refined motion vector.

* * * * *